US012394909B2

(12) United States Patent
Fan et al.

(10) Patent No.: US 12,394,909 B2
(45) Date of Patent: Aug. 19, 2025

(54) ANTENNA AND ELECTRONIC DEVICE

(71) Applicants: Beijing BOE Technology Development Co., Ltd., Beijing (CN); BOE Technology Group Co., Ltd., Beijing (CN)

(72) Inventors: Xichao Fan, Beijing (CN); Yali Wang, Beijing (CN); Youjian Hu, Beijing (CN); Zhipeng Lu, Beijing (CN); Guoqiang Tang, Beijing (CN)

(73) Assignees: Beijing BOE Technology Development Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/016,682

(22) PCT Filed: Feb. 21, 2022

(86) PCT No.: PCT/CN2022/077115

§ 371 (c)(1),
(2) Date: Jan. 18, 2023

(87) PCT Pub. No.: WO2023/155196

PCT Pub. Date: Aug. 24, 2023

(65) Prior Publication Data

US 2024/0243480 A1 Jul. 18, 2024

(51) Int. Cl.
*H01Q 13/02* (2006.01)
*H01Q 1/36* (2006.01)
(Continued)

(52) U.S. Cl.
CPC ........... *H01Q 13/0233* (2013.01); *H01Q 1/36* (2013.01); *H01Q 1/48* (2013.01); *H01Q 1/50* (2013.01); *H01Q 13/10* (2013.01)

(58) Field of Classification Search
CPC .. H01Q 13/0233; H01Q 13/10; H01Q 13/085; H01Q 1/36; H01Q 1/48; H01Q 1/50; H01Q 15/0006
See application file for complete search history.

(56) References Cited

U.S. PATENT DOCUMENTS 5,081,466 A * 1/1992 Bitter, Jr. ............. H01Q 13/085 343/767
6,867,742 B1 * 3/2005 Irion, II ............... H01Q 13/085 343/770
(Continued)

FOREIGN PATENT DOCUMENTS

CN 105490016 B 1/2018
CN 113555666 A 10/2021
(Continued)

*Primary Examiner* — Hai V Tran
(74) *Attorney, Agent, or Firm* — Ling Wu; Stephen Yang; Ling and Yang Intellectual Property

(57) ABSTRACT

An antenna and an electronic device are provided in the present disclosure. The antenna includes a first conductive layer, a dielectric layer, and a second conductive layer which are stacked; the first conductive layer is provided as a microstrip line structure; the second conductive layer is provided with a radiation structure and a director; the radiation structure includes a first edge and a second edge disposed oppositely along a first direction; the radiation structure is provided with a first slot, a second slot, and a third slot that are sequentially communicated along the first direction and away from the first edge, the first slot is circular, the second slot is rectangular, and the third slot gradually increases in dimension in the second direction; the director is disposed on the second conductive layer and located at a side of the third slot away from the second slot.

19 Claims, 27 Drawing Sheets

(51) Int. Cl.

| | |
|---|---|
| ***H01Q 1/48*** | (2006.01) |
| ***H01Q 1/50*** | (2006.01) |
| ***H01Q 13/10*** | (2006.01) |

(56) References Cited

U.S. PATENT DOCUMENTS

| | | | | |
|---|---|---|---|---|
| 10,938,082 | B2 * | 3/2021 | Rogers | H01Q 21/065 |
| 11,114,766 | B1 * | 9/2021 | Hyman | H01Q 13/085 |
| 2007/0195004 | A1 | 8/2007 | Rebeiz et al. | |
| 2013/0241787 | A1 * | 9/2013 | Coburn | H01Q 13/085 343/770 |
| 2016/0294066 | A1 * | 10/2016 | Djerafi | H01Q 21/065 |
| 2017/0207546 | A1 | 7/2017 | Benzel et al. | |
| 2018/0342471 | A1 * | 11/2018 | Hsu | H01Q 13/02 |

FOREIGN PATENT DOCUMENTS

| | | | |
|---|---|---|---|
| CN | 113140914 | B | 12/2021 |
| CN | 113794045 | A | 12/2021 |
| WO | 2005094352 | A2 | 10/2005 |

* cited by examiner

ANTENNA AND ELECTRONIC DEVICE

CROSS-REFERENCE TO RELATED APPLICATION

The present application is a U.S. National Phase Entry of International Application PCT/CN2022/077115 having an international filing date of Feb. 21, 2022, and the contents disclosed in the above-mentioned application are hereby incorporated as a part of this application.

TECHNICAL FIELD

Embodiments of the present disclosure relate to, but are not limited to, the field of communication technologies, and in particular to an antenna and an electronic device.

BACKGROUND

With development of wireless communication technology and advent of the fifth generation mobile communication technology (5G), wireless communication technology plays an increasingly important role in the satellite industry. Since antenna is a key component in a satellite transceiver system, with the layout of the satellite industry, research and development of high-gain broadband antenna has been paid more and more attention in the field of satellite communication.

Vivaldi antenna is an end-fire tapered slot antenna, which has advantages such as wide band, wide beam, low profile, good radiation orientation and easy array integration. It has a wide application prospect in millimeter wave radar, satellite technology and other communication fields.

SUMMARY

The following is a summary of subject matter described herein in detail. The summary is not intended to limit the protection scope of claims.

An embodiment of the present disclosure provides an antenna, including a first conductive layer, a dielectric layer and a second conductive layer which are stacked;

the first conductive layer is provided as a microstrip line structure;

the second conductive layer is provided with a radiation structure and a director; the radiation structure includes a first edge and a second edge opposite to each other along a first direction in a plane where the second conductive layer is located; the radiation structure is provided with a radiation slot away from the first edge, and the radiation slot includes a first slot, a second slot and a third slot which are sequentially communicated along a first direction in a plane where the second conductive layer is located, a shape of the first slot is circular, a shape of the second slot is rectangular, the third slot gradually increases in dimension in a second direction from an end connected with the second slot to an end away from the second slot, and the third slot extends in the first direction from the second slot to the second edge of the radiation structure; and the director is disposed on the second conductive layer and located at a side of the third opening away from the second slot, and an orthographic projection of the director on the dielectric layer is at least partially overlapped with an orthographic projection of the third slot on the dielectric layer.

In an exemplary implementation, in a plane where the second conductive layer is located, the radiation slot is disposed symmetrically with respect to a first centerline, and the director is disposed symmetrically with respect to the first centerline, and the first centerline is a centerline of the antenna along the first direction.

In an exemplary implementation, the microstrip line structure includes a first conductive structure, a second conductive structure and a third conductive structure sequentially connected along the second direction in a plane where the first conductive layer is located, a shape of the first conductive structure is rectangular, the third conductive structure is fan-shaped, the second conductive structure gradually decreases in dimension in a first direction from an end connected with the first conductive structure to an end connected with the third conductive structure, the third conductive structure gradually increases in dimension in a first direction from an end connected with the second conductive structure to an end away from the second conductive structure; and in the plane where the first conductive layer is located, the microstrip line structure is symmetrically disposed along the first direction with respect to a second centerline, the second centerline is a centerline of the microstrip line structure along the second direction, an orthographic projection of the second centerline on the dielectric layer is perpendicular to an orthographic projection of the first centerline on the dielectric layer, and an orthographic projection of the second conductive structure on the dielectric layer is at least partially overlapped with an orthographic projection of the second slot on the dielectric layer.

In an exemplary implementation, the first conductive structure has a dimension of 0.65 mm to 0.85 mm along the first direction and a dimension of 5 mm to 7 mm along the second direction in a plane where the first conductive layer is located; the second conductive structure has a dimension of 1.6 mm to 2.2 mm along the second direction, and an end of the second conductive structure connected with the first conductive structure has a dimension of 0.45 mm to 0.6 mm along the first direction; the third conductive structure has a sector radius of 0.4 mm to 0.7 mm.

In an exemplary implementation, the first slot has a radius of 0.8 mm to 1.2 mm, the second slot has a dimension of 2.5 mm to 3.5 mm in a first direction, and the second slot has a dimension of 0.4 mm to 0.8 mm in the second direction in a plane where the second conductive layer is located.

In an exemplary implementation, the second conductive layer is further provided with multiple metamaterial structures arranged in an array;

in the plane where the second conductive layer is located, in the first direction, the multiple metamaterial structures are disposed at a side of the director away from the third slot, and an orthographic projection of the multiple metamaterial structures on the dielectric layer is not overlapped with an orthographic projection of the radiation structure on the dielectric layer, the multiple metamaterial structures are disposed symmetrically with respect to the first centerline.

In an exemplary implementation, dimensions of anyone of the metamaterial structures in the first direction and the second direction are each less than a length of half of the dielectric wavelength;

in the first direction, a distance between two adjacent metamaterial structures is less than the length of a half of the dielectric wavelength; and in the second direction, a distance between two adjacent metamaterial structures is less than the length of a half of the dielectric wavelength;

wherein, the dielectric wavelength is a wavelength of the wave transmitted or received by the antenna in the dielectric layer.

In an exemplary implementation, in the plane where the second conductive layer is located, any one of the metamaterial structures has a dimension of 1.1 mm to 1.7 mm in the first direction, any one of the metamaterial structures has a dimension of 1 mm to 1.6 mm in the second direction, the distance between two adjacent metamaterial structures in the first direction is 0.3 mm to 0.7 mm, and the distance between two adjacent metamaterial structures in the second direction is 0.3 mm to 0.7 mm;

the antenna has a dimension of 14.8 mm to 15.6 mm in the second direction, the antenna has a dimension of 28 mm to 34 mm in the first direction, and a distance from the first edge of the radiation structure to the junction of the first slot and the second slot in the first direction is 5 mm to 7 mm; and the third slot has a maximum dimension of 8 mm to 10 mm in the second direction.

In an exemplary implementation, a metamaterial structure includes a first E-type structure, a second E-type structure and a first connection line connecting the first E-type structure with the second E-type structure. In the plane where the second conductive layer is located, the first E-shaped structure and the second E-shaped structure are symmetrically disposed with respect to a midperpendicular line of the first connection line, the first connection line extends along the second direction and is located at a position of a third centerline, the first E-shaped structure is disposed symmetrically with respect to the third centerline along the first direction, and the second E-shaped structure is disposed symmetrically with respect to the third centerline along the first direction, an opening of the first E-shaped structure faces a side away from the second E-shaped structure, and an opening of the second E-shaped structure faces a side away from the first E-shaped structure.

In an exemplary implementation, the first connection line has a dimension of 0.2 mm to 0.6 mm along the second direction; for ends located at a same side of the third centerline in the first direction, a distance between an end of the first E-shaped structure away from the second E-shaped structure and an end of the second E-shaped structure away from the first E-shaped structure in the second direction is 1 mm to 1.6 mm; at the position of the third centerline, a distance between an end of the first E-type structure away from the second E-type structure and an end of the second E-type structure away from the first E-type structure in the second direction is 1.1 mm to 1.7 mm; a width dimension of lines constituting the first E-shaped structure and the second E-shaped structure and a width dimension of a line constituting the first connection line are both 0.1 mm to 0.3 mm.

In an exemplary implementation, a metamaterial structure includes a first I-shaped structure and a second I-shaped structure, in the plane where the second conductive layer is located, the first I-shaped structure includes a first connection line and a second connection line extending along the first direction and a third connection line extending along the second direction, wherein the third connection line is positioned at a midperpendicular line of the first connection line and the second connection line;

in the plane where the second conductive layer is located, the second I-shaped structure includes a fourth connection line and a fifth connection line extending along the second direction and a sixth connection line extending along the first direction, wherein the sixth connection line is located at the midperpendicular line of the fourth connection line and the fifth connection line; and the third connection line is located at a centerline of the sixth connection line, and the sixth connection line is located at a centerline of the third connection line.

In an exemplary implementation, line widths of the first connection line to the sixth connection line are each 0.1 mm to 0.3 mm; in the plane where the second conductive layer is located, the first connection line and second connection line have a dimension from 0.8 mm to 1.3 mm along the first direction, the third connection line has a dimension from 0.7 mm to 1.5 mm along the second direction, the fourth connection line and the fifth connection line have a dimension from 0.8 mm to 1.3 mm along the second direction, and the sixth connection line has a dimension from 0.7 mm to 1.5 mm along the first direction.

In an exemplary implementation, the radiation structure further includes a third edge and a fourth edge opposite to each other along the second direction in the plane where the second conductive layer is located. On the plane where the second conductive layer is located, the radiation structure is provided with multiple flow suppression grooves, and the flow suppression grooves include multiple first flow suppression grooves arranged along the first direction and multiple second flow suppression grooves arranged along the first direction, wherein the first flow suppression grooves and the second flow suppression grooves are symmetrically disposed with respect to the centerline of the antenna along the first direction; the multiple first flow suppression grooves are disposed at a side of the third opening slot, and the multiple second flow suppression grooves are disposed at a side of the third slot away from the multiple first flow suppression grooves; the first flow suppression grooves extend to the third edge, and the second flow suppression grooves extend to the fourth edge.

In an exemplary implementation, extension directions of the first flow suppression grooves and the second flow suppression grooves are perpendicular to the centerline of the antenna along the first direction.

In an exemplary implementation, a shape of a flow suppression groove is rectangular; on the plane where the second conductive layer is located, a dimension of the flow suppression groove along the second direction satisfies a following formula: $0.25*\lambda g/\mathrm{sqrt}(\varepsilon 0)$, wherein $\lambda g$ is a wavelength of the antenna's low-frequency dielectric frequency, $\varepsilon 0$ is a dielectric constant of the dielectric plate, and sqrt $(\varepsilon 0)$ is an arithmetic square root of the dielectric constant 80 of the dielectric plate.

In an exemplary implementation, on the plane where the second conductive layer is located, a flow suppression groove has a dimension of 4.5 mm to 5.5 mm along the second direction, and the flow suppression grooves has a dimension of 0.5 mm to 1.5 mm along first direction.

In an exemplary implementation, in the plane where the second conductive layer is located, any one of the flow suppression grooves includes a first groove edge, a second groove edge and a third groove edge, a shape of the first groove edge and the second groove edge is a linear shape extending along the second direction, a shape of the third groove edge is an arc shape protruding toward the radiation groove, and two ends of the third groove edge are respectively connected with one end of the first groove edge and one end of the second groove edge close to the radiation groove.

In an exemplary implementation, a shape of the director is rectangular and the rectangular director is disposed symmetrically with respect to the first centerline; or the shape of the director is elliptical, and the elliptical director is symmetrically disposed with respect to the first centerline; or the shape of the director is circular, and the circular director is symmetrically disposed with respect to the first centerline; or the shape of the director is isosceles triangular, and the isosceles triangular director is symmetrically disposed with respect to the first centerline, an apex angle of the isosceles triangle is located between the radiation slot and a bottom edge of the isosceles triangle, a length of the bottom edge of the isosceles triangle is 1.8 mm to 2.2 mm, and a length of two waists of the isosceles triangle is 2 mm to 4 mm.

An embodiment of the present disclosure further provides an electronic device, which includes at least one array antenna in any one of the embodiments described above.

In an exemplary implementation, the electronic device includes multiple the antennas, the multiple the antennas are arranged in a third direction to form an antenna array, and orthographic projections of the multiple antennas on a plane where the first direction and the second direction are located are overlapped, and orthographic projections of radiation slots in the multiple antennas on a plane where the first direction and the second direction are located are overlapped.

Other aspects may be understood upon reading and understanding of the drawings and the detailed description.

BRIEF DESCRIPTION OF DRAWINGS

Accompanying drawings are intended to provide a further understanding of technical solutions of the present disclosure and form a part of the specification, and are used to explain the technical solutions of the present disclosure together with embodiments of the present disclosure, and not intended to form limitations on the technical solutions of the present disclosure. Shapes and sizes of each component in the drawings do not reflect actual scales, and are only intended to schematically illustrate contents of the present disclosure.

DETAILED DESCRIPTION

Figure 1A:
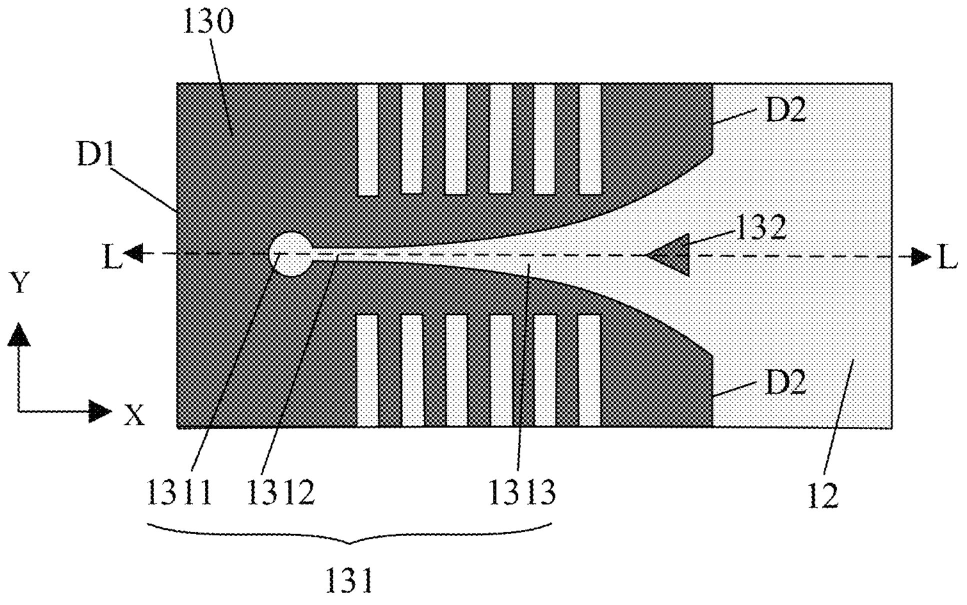
FIG. 1*a* is a schematic diagram of a planar structure of an antenna located at a side of a second conductive layer according to an embodiment of the present disclosure.

The embodiments of the present disclosure will be described in detail below with reference to the drawings. Implementation modes may be implemented in multiple different forms. Those of ordinary skills in the art may easily understand such a fact that implementation modes and contents may be transformed into various forms without departing from the purpose and scope of the present disclosure. Therefore, the present disclosure should not be explained as being limited to contents described in following implementation modes only. The embodiments in the present disclosure and features in the embodiments may be combined randomly with each other without conflict. In order to keep following description of the embodiments of the present disclosure clear and concise, detailed descriptions about part of known functions and known components are omitted in the present disclosure. The drawings of the embodiments of the present disclosure only involve structures involved in the embodiments of the present disclosure, and other structures may refer to conventional designs.

Scales of the drawings in the present disclosure may be used as a reference in the actual process, but are not limited thereto. For example, a thickness and a distance of each film layer, and a width and a distance of each signal line may be adjusted according to an actual situation. The drawings described in the present disclosure are only schematic diagrams of structures, and one implementation mode of the present disclosure is not limited to shapes or numerical values or the like shown in the drawings.

Ordinal numerals such as "first", "second", and "third" in the specification are set to avoid confusion between constituent elements, but not to set a limit in quantity.

In the specification, for convenience, wordings indicating orientation or positional relationships, such as "middle", "upper", "lower", "front", "back", "vertical", "horizontal", "top", "bottom", "inside", and "outside", are used for illustrating positional relationships between constituent elements with reference to the drawings, and are merely for facilitating the description of the specification and simplifying the description, rather than indicating or implying that a referred apparatus or element must have a particular orientation and be constructed and operated in the particular orientation. Therefore, they cannot be understood as limitations on the present disclosure. The positional relationships between the constituent elements may be changed as appropriate according to a direction according to which each constituent element is described. Therefore, appropriate replacements may be made according to situations without being limited to the wordings described in the specification.

In the specification, unless otherwise specified and defined explicitly, terms "mount", "mutually connect", and "connect" should be understood in a broad sense. For example, a connection may be a fixed connection, or a detachable connection, or an integrated connection. It may be a mechanical connection or an electrical connection. It may be a direct mutual connection, or an indirect connection through middleware, or internal communication between two components. Those of ordinary skills in the art may understand specific meanings of these terms in the present disclosure according to specific situations.

In the specification, "electrical connection" includes a case that constituent elements are connected together through an element with a certain electrical effect. The "element with the certain electrical effect" is not particularly limited as long as electrical signals may be sent and received between the connected constituent elements. Examples of the "element having some electrical function" not only include an electrode and a wiring, but also a switch element such as a transistor, a resistor, an inductor, a capacitor, another element having one or more functions, and the like.

In the specification, "parallel" refers to a state in which an angle formed by two straight lines is above −10° and below 10°, and thus may include a state in which the angle is above −5° or more and below 5°. In addition, "perpendicular" refers to a state in which an angle formed by two straight lines is above 80° and below 100°, and thus may include a state in which the angle is above 85° and below 95°.

In the specification, a "film" and a "layer" are interchangeable. For example, a "conductive layer" may be replaced with a "conductive film" sometimes. Similarly, an "insulating film" may be replaced with an "insulation layer" sometimes.

Triangle, rectangle, trapezoid, pentagon and hexagon in this specification are not strictly defined, and they may be approximate triangle, rectangle, trapezoid, pentagon or hexagon, etc. There may be some small deformation caused by tolerance, and there may be guide angle, arc edge and deformation, etc.

In the present disclosure, "about" refers to that a boundary is defined not so strictly and numerical values within process and measurement error ranges are allowed.

In the present disclosure, a "thickness" is a dimension of a film layer in a direction perpendicular to a base substrate.

Vivaldi antenna usually has a problem of insufficient gain in wireless communication. Increasing the gain by forming an array will greatly increase the antenna's dimension, which is not conducive to miniaturization design of the system, thus increasing the system cost. As a result, Vivaldi antenna is often limited because of its insufficient gain in application scenarios with high gain requirements (such as satellite communication, radar, etc.).

Figure 1B:
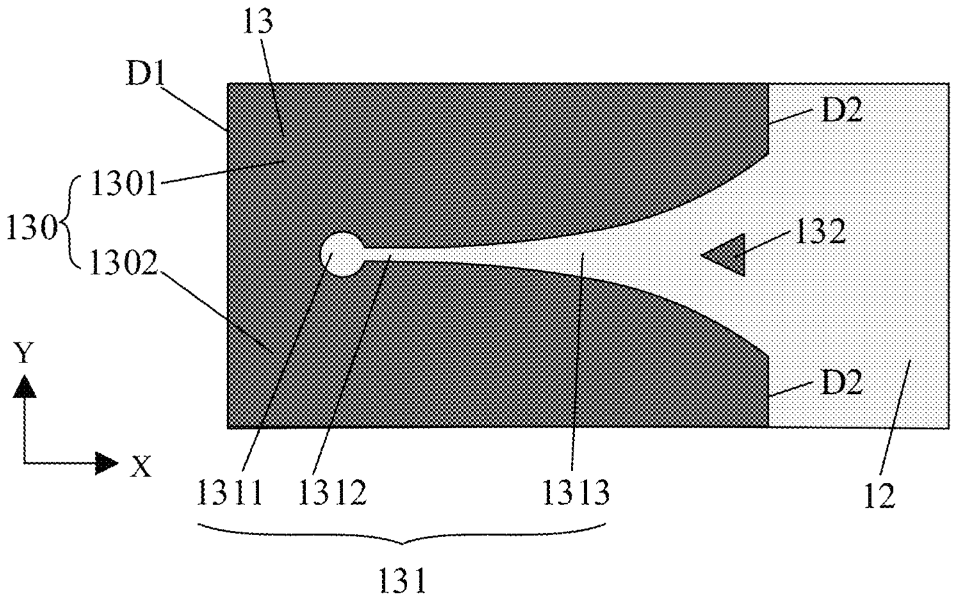
FIG. 1*b* is a schematic diagram of a planar structure of an antenna located at a side of a second conductive layer according to an embodiment of the present disclosure.
Figure 2:
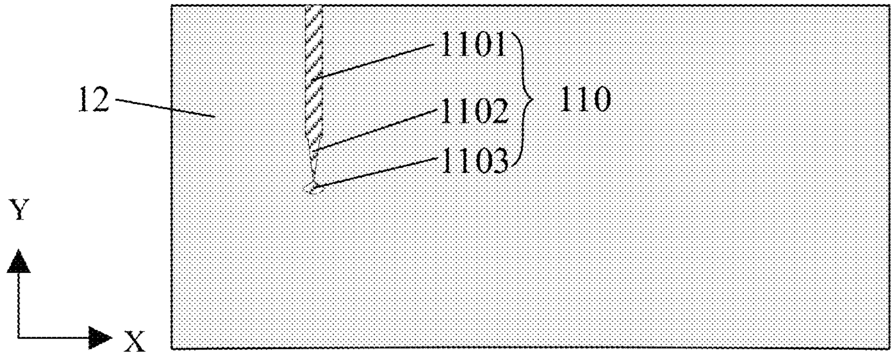
FIG. 2 is a schematic diagram of a planar structure of an antenna located at a side of a first conductive layer according to an embodiment of the present disclosure.
Figure 3:
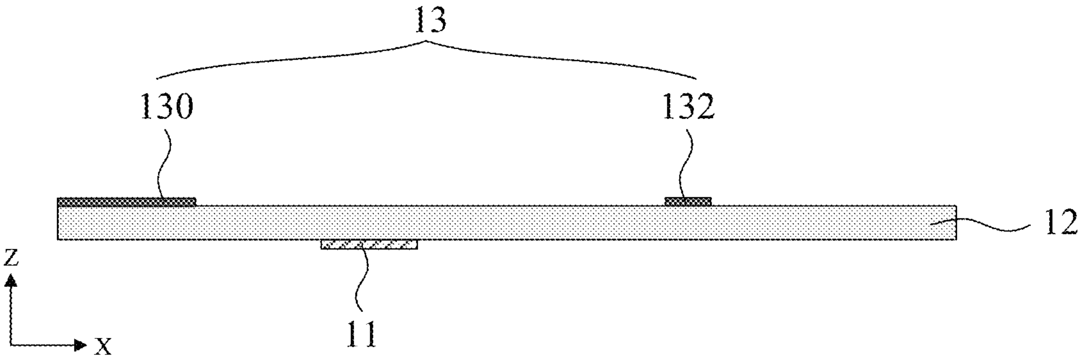
FIG. 3 is a schematic diagram of a sectional structure of L-L position in FIG. 1*a* in FIG. 1.

An embodiment of the present disclosure provides an antenna, as shown in FIG. 1*a*, FIG. 1*b*, FIG. 2 and FIG. 3, including a first conductive layer 11, a dielectric layer 12, and a second conductive layer 13 which are stacked. FIG. 1*a*-FIG. 1*b* show a schematic diagram of a planar structure located at a side of the second conductive layer 13, FIG. 2 shows a schematic diagram of a sectional structure at position L-L in FIG. 1*a*, and FIG. 3 shows a schematic diagram of a planar structure located at a side of the first conductive layer 11;

the first conductive layer 11 is provided as a microstrip line structure 110;

the second conductive layer 13 is provided with a radiation structure 130 and a director 132; the radiation structure 130 includes a first edge D1 and a second edge D2 disposed oppositely along a first direction in a plane where the second conductive layer is located;

the radiation structure 130 is provided with a radiation slot 131 away from the first edge D1, wherein the radiation slot 131 includes a first slot 1311, a second slot 1312, and a third slot 1313 that are sequentially communicated along the first direction X in the plane where the second conductive layer 13 is located, a shape of the first slot 1311 is circular, a shape of the second slot 1312 is rectangular, the third slot 1313 gradually increases in dimension along a second direction Y from an end connected with the second slot 1312 to an end away from the second slot 1312, and the third slot 1313 extends from the second slot 1312 in the first direction X to the second edge D2 of the radiation structure;

the director 132 is disposed in the second conductive layer 13 and located at a side of the third slot 1313 away from the second slot 1312, and an orthographic projection of the director 132 on the dielectric layer 12 is at least partially overlapped with an orthographic projection of the third slot 1313 on the dielectric layer.

In the antenna according to embodiment of the present disclosure, the second conductive layer is provided with the director and the radiation slot, the radiation slot is provided as the first slot, the second slot and the third slot which are communicated sequentially along the first direction in the plane where the second conductive layer is located, the director is disposed at the second conductive layer and located the side of the third slot away from the second slot, and an orthographic projection of the director on the dielectric layer is at least partially overlapped with an orthographic projection of the third slot on the dielectric layer. The director is disposed at the second conductive layer and located at the side of the third slot away from the second slot and plays a guiding role on electromagnetic waves, thus improving the gain of the antenna to a great extent.

In the embodiment of the present disclosure, in the plane where the second conductive layer 13 is located, the first direction X intersects with the second direction Y. In an exemplary implementation, the first direction X may be perpendicular to the second direction Y in the plane where the second conductive layer 13 is located.

In the embodiment of the present disclosure, the first slot 1311 in circular structure may act as impedance matching to the microstrip line structure 110, the second slot 1312 in rectangular structure may be coupled with the microstrip line structure 110 to transmit electromagnetic waves, the third slot 1313 may be horn-shaped, and the third slot 1313 may guide electromagnetic waves radiated by the antenna.

Figure 1C:
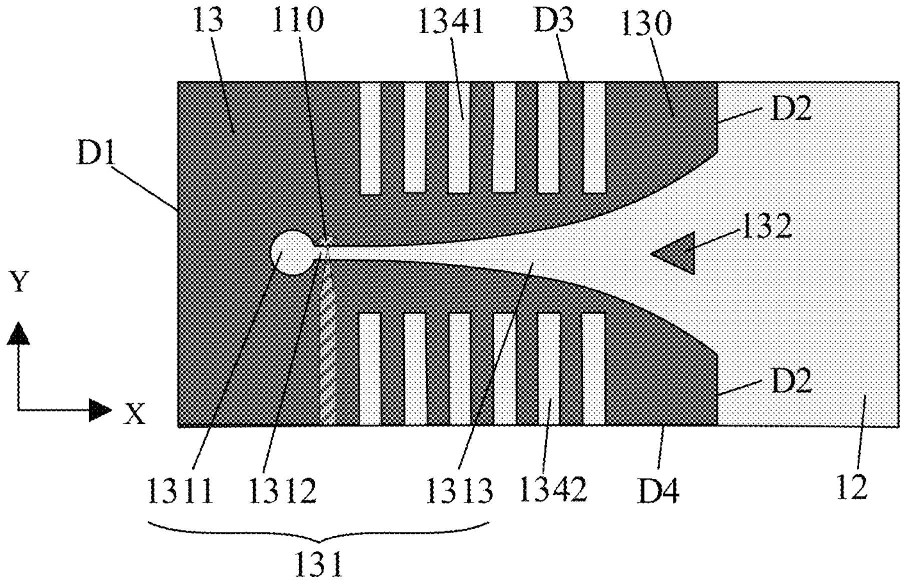
FIG. 1*c* is a schematic diagram of a planar structure of an antenna according to an embodiment of the present disclosure located at a side of a second conductive layer.

In an exemplary implementation, as shown in FIG. 1*b*-FIG. 1*c*, in the plane where the second conductive layer 13 is located, the radiation slot 131 may be disposed symmetrically with respect to a first centerline, and the director 132 may be disposed symmetrically with respect to the first centerline, wherein the first centerline is a centerline of the antenna along the first direction X.

In an exemplary implementation, as shown in FIG. 2, the microstrip line structure 110 may include a first conductive structure 1101, a second conductive structure 1102, and a third conductive structure 1103 sequentially connected along the second direction Y in a plane where the first conductive layer 11 is located. A shape of the first conductive structure 1101 rectangular, the third conductive structure 1103 is fan-shaped, and the second conductive structure 1102 gradually decreases in dimension in the first direction X from one end connected with the first conductive structure 1101 to one end connected with the third conductive structure 1103. The third conductive structure 1103 gradually increases in dimension in the first direction X from one end connected with the second conductive structure 1102 to one end away from the second conductive structure 1102.

In the plane where the antenna is located, as shown in FIG. 1 and FIG. 2, which are schematic diagrams of an antenna structure, arrangement directions of the first conductive structure 1101, the second conductive structure 1102 and the third conductive structure 1103 are perpendicular to arrangement directions of the first slot 1311, the second slot 1312 and the third slot 1313. The microstrip line structure 110 is symmetrical with respect to a centerline of the microstrip line structure 110 extending along the second direction Y.

In the plane where the first conductive layer 11 is located, the microstrip line structure 110 is disposed symmetrically along the first direction X with respect to a second centerline, and the second centerline is a centerline of the microstrip line structure 110 along the second direction Y. An orthographic projection of the second centerline on the dielectric layer 12 is perpendicular to an orthographic projection of the first centerline on the dielectric layer 12, and an orthographic projection of the second conductive structure 1102 on the dielectric layer 12 is at least partially overlapped with an orthographic projection of the second slot 1312 on the dielectric layer 12.

In an exemplary implementation, a shape of the second conductive structure 1102 may be triangular.

Figure 4:
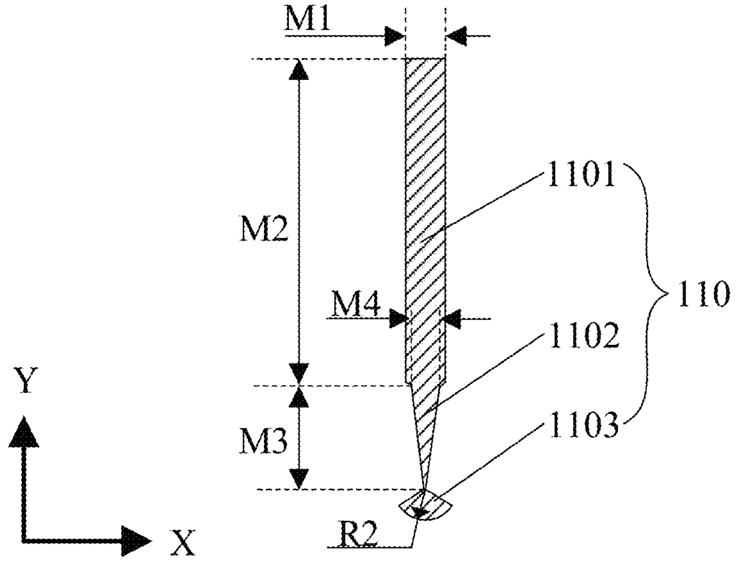
FIG. 4 is a schematic diagram of a planar structure of a microstrip line structure in an antenna according to an exemplary embodiment of the present disclosure.

In an exemplary implementation, as shown in FIG. 4, in the plane where the first conductive layer 11 is located, the first conductive structure 1101 has a dimension M1 of 0.65 mm to 0.85 mm along the first direction X and a dimension M2 of 5 mm to 7 mm along the second direction Y.

The second conductive structure 1102 has a dimension M3 of 1.6 mm to 2.2 mm along the second direction Y, and the end of the second conductive structure 1102 connected with the first conductive structure 1101 has a dimension M4 of 0.45 mm to 0.6 mm in the first direction X.

The third conductive structure 1103 has a sector radius R2 of 0.4 mm to 0.7 mm.

For example, in the plane where the first conductive layer 11 is located, the first conductive structure 1101 has a dimension M1 of 0.75 mm along the first direction X and a dimension M2 of 6 mm in the second direction Y. The second conductive structure 1102 has a dimension M3 of 1.9 mm along the second direction Y, and the end of the second conductive structure 1102 connected with the first conductive structure 1101 has a dimension M4 of 0.55 mm in the first direction X. The third conductive structure 1103 has a sector radius R of 0.6 mm.

In the embodiment of the present disclosure, the gradually deformed microstrip line structure 110 is adopted, which is easy to process, thus costs and difficulty of preparing the antenna is reduced, and feed is performed through the coupling structure of the gradually deformed microstrip line structure 110 and the radiation slot 131, thus realizing the transformation from an unbalanced structure to a balanced structure. An terminal of the microstrip line structure 110

(the third conductive structure 1103) has a fan-shaped structure, which mainly serves as a function of terminal load matching, and the microstrip line is coupled and fed to the radiation slot 131 through the dielectric layer.

Figure 5:
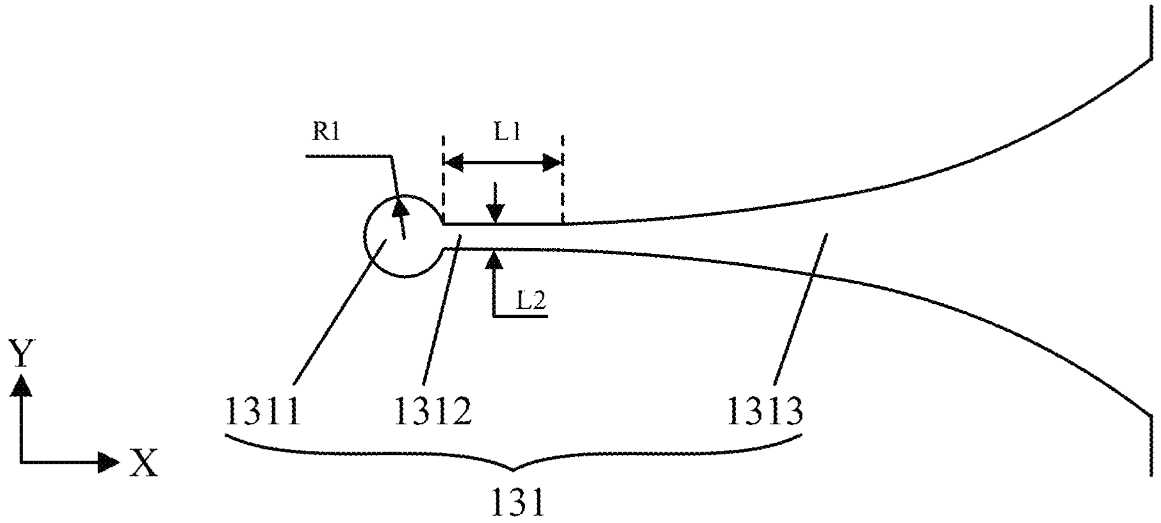
FIG. 5 is a schematic diagram of a planar structure of a radiation slot in an antenna according to an exemplary implementation of the present disclosure.

In an exemplary implementation, as shown in FIG. 5, in the plane where the second conductive layer 12 is located, a radius R1 of the first slot 1311 is 0.8 mm to 1.2 mm, a dimension L1 of the second slot 1312 in the first direction X is 2.5 mm to 3.5 mm, and a dimension L2 of the second slot 1312 in the second direction Y is 0.4 mm to 0.8 mm. For example, in the plane where the second conductive layer 12 is located, a radius R1 of the circular structure in which the first slot 1311 is located is 1 mm, a dimension L1 of the second groove 1312 in the first direction X is 3 mm, and a dimension L2 of the second groove 1312 in the second direction Y is 0.6 mm.

Figure 6A:
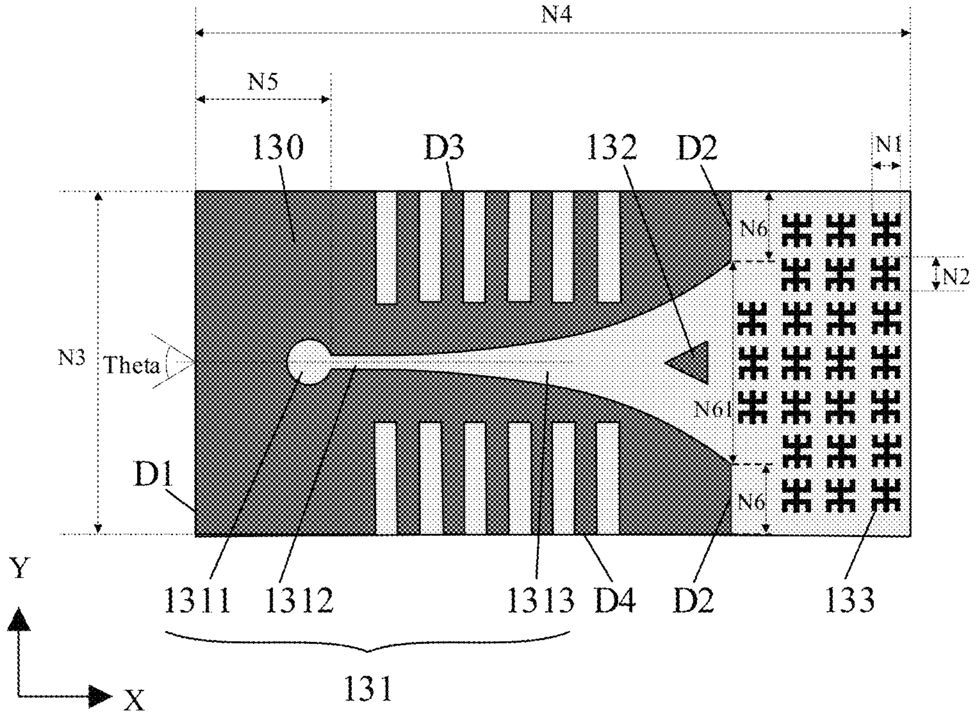
FIG. 6*a* is a schematic diagram of a planar structure of an antenna located at a side of a second conductive layer according to an exemplary embodiment of the present disclosure.
Figure 6B:
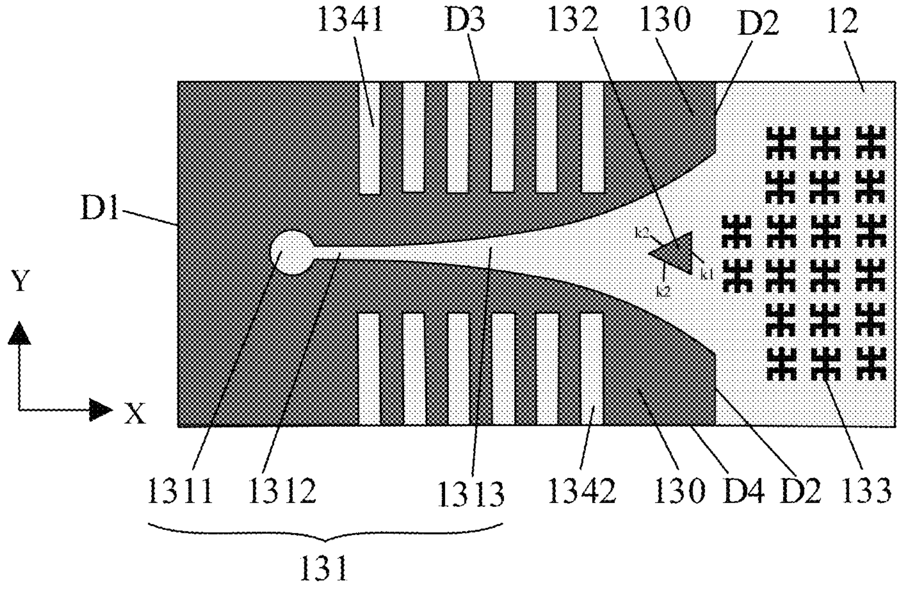
FIG. 6*b* is another schematic diagram of a planar structure of an antenna located at a side of a second conductive layer according to an exemplary embodiment of the present disclosure.

In an exemplary implementation, as shown in FIG. 6*a* and FIG. 6*b*, the second conductive layer 13 is further provided with multiple metamaterial structures 133 arranged in an array.

In the plane where the second conductive layer 13 is located, in the first direction X, multiple metamaterial structures 133 are disposed at a side of the director 132 away from the third slot 1313, and an orthographic projection of the multiple metamaterial structures 133 on the dielectric layer 12 is not overlapped with an orthographic projection of the radiation structure 130 on the dielectric layer 12, and the multiple metamaterial structures 133 are disposed symmetrically with respect to the first centerline. As shown in FIG. 6*a*, among the multiple metamaterial structures 133, a part of the metamaterial structures 133 are located at a centerline of the antenna in the first direction X, and a part of the metamaterial structures 133 are symmetrically disposed at two sides of the first centerline. The metamaterial structures 133 located at the first centerline are symmetrically disposed with respect to the first centerline, and the multiple metamaterial structures 133 located on the two sides of the first centerline are symmetrically disposed with respect to the first centerline. As shown in FIG. 6*b*, the antenna is not provided with the metamaterial structure 133 at the first centerline and the multiple metamaterial structures 133 are disposed symmetrically with respect to the first centerline.

In an exemplary implementation, the multiple metamaterial structures 133 are periodically arranged in the first direction X and the second direction Y in the plane where the second conductive layer 13 is located.

In an exemplary implementation, in the plane where the second conductive layer 13 is located, dimensions of any one of the metamaterial structures 133 in the first direction X and the second direction Y are each less than a length of a half of a dielectric wavelength.

In the first direction X, a distance between two adjacent metamaterial structures 133 is less than a length of the half of the dielectric wavelength.

In the second direction Y, a distance between two adjacent metamaterial structures 133 is less than the length of the half of the dielectric wavelength.

Here, the dielectric wavelength is a wavelength of waves transmitted or received by the antenna that are transmitted in the dielectric layer 12.

In an exemplary implementation, as shown in FIG. 6*a*, in the plane where the second conductive layer 13 is located, any one of the metamaterial structures 133 has a dimension N1 of 1.1 mm to 1.7 mm in the first direction X, and any one of the metamaterial structures 133 has a dimension N2 of 1 mm to 1.6 mm in the second direction Y. For example, any one of the metamaterial structures 133 has a dimension N1 of 1.3 mm in the first direction X, and any one of the metamaterial structures 133 has a dimension N2 of 1.4 mm in the second direction Y.

In an exemplary implementation, as shown in FIG. 6*a*, in the plane where the second conductive layer 13 is located, the antenna has a dimension N3 of 14.8 mm to 15.6 mm in the second direction Y, the antenna has a dimension N4 of 28 mm to 34 mm in the first direction, and a distance from the first edge D1 of the radiation structure 130 to a junction of the first slot 13111 and the second slot 1312 in the first direction X is 5 mm to 7 mm.

The third slot 1313 has a maximum dimension N61 of 8 mm to 10 mm in the second direction Y. In the structure shown in FIG. 6*a*, the second edge D2 of the radiation structure 130 has a dimension N6 of 3 mm to 3.6 mm in the second direction Y.

For example, in the plane where the second conductive layer 13 is located, the antenna has a dimension N3 of 15.2 mm in the second direction Y, the antenna has a dimension N4 of 31.2 mm in the first direction, and a distance N5 from the first edge D1 of the radiation structure 130 to the junction of the first slot 1311 and the second slot 1312 in the first direction X is 6 mm. The second edge D2 of the radiation structure 130 has a length N6 of 3.32 mm in the second direction Y, and the third slot 1313 has a maximum dimension of 8.56 mm in the second direction Y.

Figure 6C:
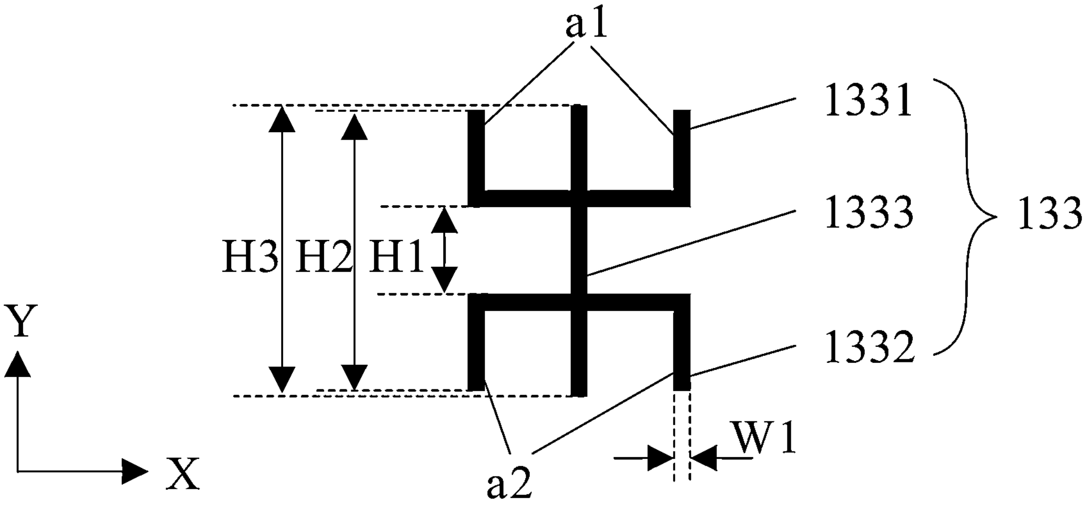
FIG. 6*c* is an enlarged schematic diagram of a structure of a metamaterial structure according to an exemplary embodiment of the present disclosure.
Figure 6D:
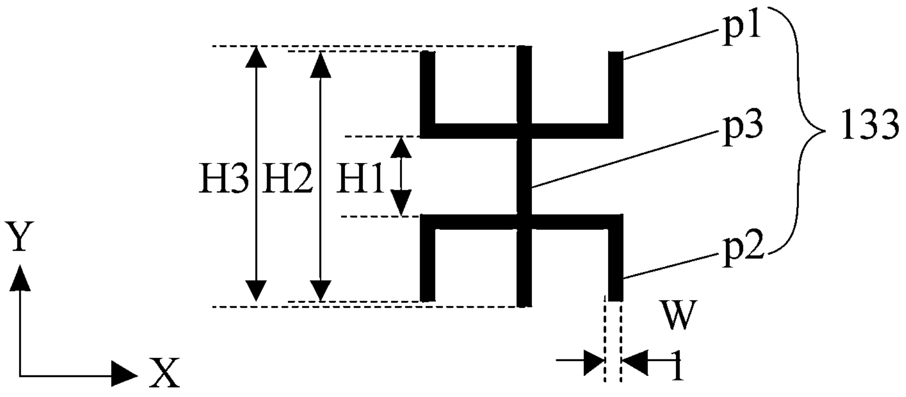
FIG. 6*d* is an enlarged schematic diagram of a structure of a metamaterial structure according to an exemplary embodiment of the present disclosure.

In an exemplary implementation, as shown in FIG. 6*d*, a metamaterial structure 133 may include a first E-type structure p1, a second E-type structure p2 and a first connection line p3 connected with the first E-type structure and the second E-type structure. In the plane where the second conductive layer 12 is located, the first E-shaped structure p1 and the second E-shaped structure p2 are disposed symmetrically with respect to a midperpendicular line of the first connection line p3, and the first connection line p3 extends along the second direction Y and is located at a third centerline. The first E-shaped structure p1 is disposed symmetrically with respect to the third centerline along the first direction X, and the second E-shaped structure p2 is disposed symmetrically with respect to the third centerline along the first direction X, an opening of the first E-shaped structure p1 faces a side away from the second E-shaped structure p2, and an opening of the second E-shaped structure p2 faces a side away from the first E-shaped structure p1.

In an exemplary implementation, the first connection line p3 has a dimension H1 of 0.2 mm to 0.6 mm in the second direction Y. For ends located at a same side of the third centerline in the first direction X, a distance H2 between an end of the first E-type structure p1 away from the second E-type structure p2 and an end of the second E-type structure p2 away from the first E-type structure p1 in the second direction Y is 1 mm to 1.6 mm. At the third centerline, a distance H3 between the end of the first E-type structure p1 away from the second E-type structure p2 and the end of the second E-type structure p2 away from the first E-type structure p1 in the second direction Y is 1.1 mm to 1.7 mm. A width W1 of lines constituting the first E-shaped structure p1 and the second E-shaped structure p2 and a width W1 of lines the constituting first connection line p3 are both 0.1 mm to 0.3 mm. For example, the first connection line p3 has a dimension H1 of 0.4 mm in the second direction Y, and for ends located at a same side of the third centerline in the first direction X, and a distance H2 between the end of the first E-type structure p1 away from the second E-type structure p2 and the end of the second E-type structure p2 away from the first E-type structure p1 in the second direction Y is 1.3 mm. At the third centerline, a distance H3 between the end of the first E-type structure p1 away from the second E-type structure p2 and the end of the second E-type structure p2 away from the first E-type structure p1 in the second direction Y is 1.4 mm. A width W1 of the lines constituting the first E-shaped structure p1 and the second E-shaped structure p2 and a width W1 of the lines constituting the first connection line p3 are both 0.2 mm.

In the embodiment of the present disclosure, centerlines of the first E-type structure p1 and the second E-type structure p2 in FIG. 6*d* along the second direction Y in the plane where the second conductive layer 13 is located are both the third centerline.

In an exemplary implementation, as shown in FIG. 6*a* to FIG. 6*c*, a metamaterial structure 133 may include a first bent structure 1331, a second bent structure 1332, and a connection structure 1333. In the plane where the second conductive layer 13 is located, the first bent structure 1331 is symmetrical with respect to the connection structure 1333, the second bent structure 1332 is symmetrical with respect to the connection structure 1333, and the first bent structure 1331 and the second bent structure 1332 are disposed symmetrically with respect to the connection structure 1333. The connection structure 1333 extends along the second direction Y and is disposed at a centerline of the first bent structure 1331 extending along the second direction Y, and the centerline of the first bent structure 1331 along the second direction Y is coincident with a centerline of the second bent structure 1332 along the second direction Y. A midperpendicular line of the connection structure 1333 is coincident with centerlines of the first bent structure 1331 and the second bent structure 1332 along the first direction X. Two ends of the first bent structure 1331 are bent toward a side facing away from the second bent structure 1332 to form two first bent portions a1 extending along the second direction Y, two ends of the second bent structure 1332 are bent toward a side facing away from the first bent structure 1331 to form two second bent portions a2 extending along the second direction, and a distance H2 between an end of the first bent portion a1 and an end of the second bent portion a2 located at a same side of the connection structure 1333 is 1 mm to 1.6 mm. For example, the distance H2 between the end of the first bent portion a1 and the end of the second bent portion a2 located at the same side of the connection structure 1333 is 1.3 mm.

In an exemplary implementation, in the plane where the second conductive layer 13 is located, the distance H1 between the first bent structure 1331 and the second bent structure 1332 along the second direction Y is 0.2 mm to 0.6 mm, the width W1 of the first bent structure 1331, the second bent structure 1332 and the connection structure 1333 is 0.1 mm to 0.3 mm, and the length H3 of the connection structure 1333 along the second direction Y is 1.1 mm to 1.7 mm. For example, in the plane where the second conductive layer 13 is located, the distance H1 of the first bent structure 1331 and the second bent structure 1332 along the second direction Y is 0.4 mm, the width W1 of the first bent structure 1331, the second bent structure 1332 and the connection structure 1333 is 0.2 mm, and the length H3 of the connection structure 1333 along the second direction Y is 1.4 mm.

Figure 7A:
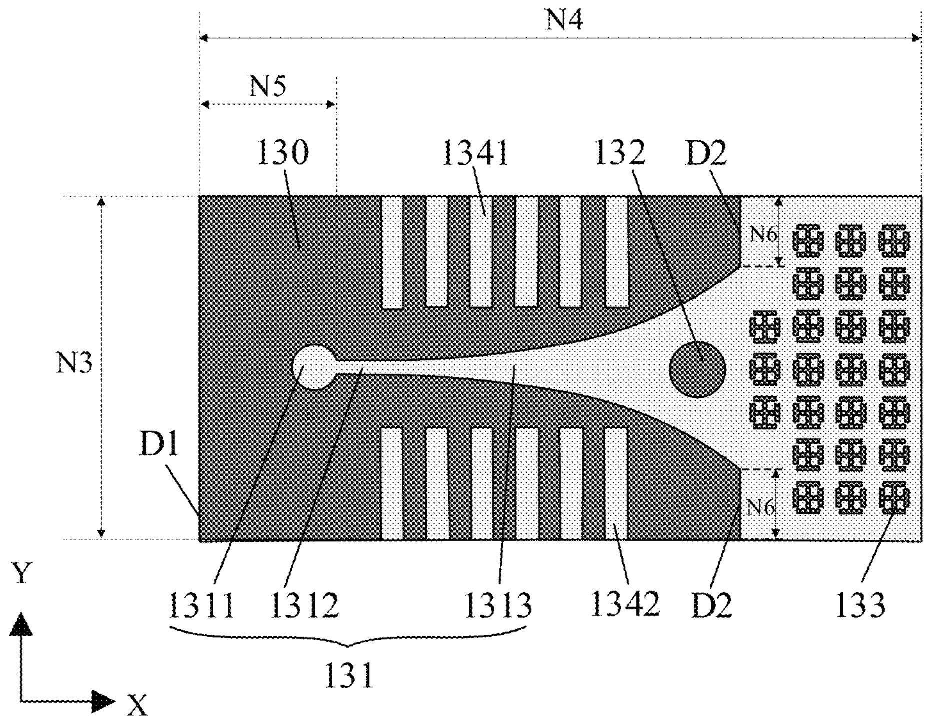
FIG. 7*a* is a schematic diagram of a planar structure of an antenna located at a side of a second conductive layer according to an exemplary embodiment of the present disclosure.
Figure 7B:
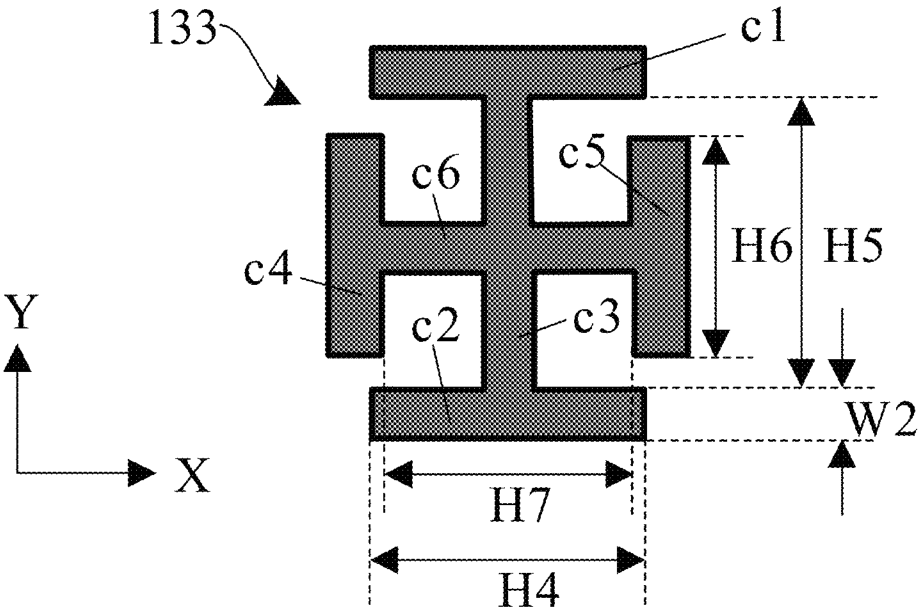
FIG. 7*b* is an enlarged schematic diagram of a structure of a metamaterial structure according to an exemplary embodiment of the present disclosure.

In an exemplary implementation, as shown in FIG. 7*a* and FIG. 7*b*, the metamaterial structure 133 may include a first I-shaped structure and a second I-shaped structure. In the plane where the second conductive layer 13 is located, the first I-shaped structure may include a first connection line c1 and a second connection line c2 extending along the first direction X and a third connection line c3 extending along the second direction Y, and the third connection line c3 is located at a midperpendicular line of the first connection line c1 and the second connection line c2.

In the plane where the second conductive layer 13 is located, the second I-shaped structure may include a fourth connection line c4 and a fifth connection line c5 extending along the second direction Y and a sixth connection line c6 extending along the first direction X, and the sixth connection line c6 is located at a midperpendicular line of the fourth connection line c4 and the fifth connection line c5.

The third connection line c3 is located at a centerline of the sixth connection line c6, and the sixth connection line c6 is located at a centerline of the third connection line c3.

In an exemplary implementation, as shown in FIG. 7*b*, line widths W2 of the first connection c1 to the sixth connection c6 may each be 0.1 mm to 0.3 mm. In the plane where the second conductive layer 13 is located, the first connection line c1 and second connection line c2 have a dimension H4 of 0.8 mm to 1.3 mm along the first direction X, the third connection line c3 has a dimension H5 of 0.7 mm to 1.5 mm along the second direction, the fourth connection line c4 and fifth connection line c5 have a dimension H6 of 0.8 mm to 1.3 mm along the second direction Y, and the sixth connection line c6 has a dimension H7 of 0.7 mm to 1.5 mm along the first direction X.

For example, the line widths W2 of the first connection line c1 to the sixth connection line c6 may each be 0.2 mm, in the plane where the second conductive layer 13 is located, the first connection line c1 and second connection line c2 have a dimension H4 of 1.1 mm along the first direction X, the third connection line c3 a dimension H5 of 0.9 mm along the second direction, the fourth connection line c4 and fifth connection line c5 have a dimension H6 of 1.1 mm along the second direction Y, and the sixth connection line c6 has a dimension H7 of 0.9 mm along the first direction X.

In the embodiment of the present disclosure, the periodically arranged metamaterial structures 132 are loaded at a side of the director 130 away from the radiation slot 131 to improve directivity of electromagnetic radiation, thereby further improving the gain of the antenna.

In the embodiments of the present disclosure, the metamaterial structures 132 may be equivalent to LC circuits, a plate provided with the metamaterial structures 132 may generate an inductance, the metamaterial structures 132 themselves and space between the multiple metamaterial structures 132 may generate capacitance, a metamaterial structure 132 has a structure with a quasi-zero dielectric constant refractive index, and a zero frequency has a certain relationship with structural parameters. By adjusting structure dimensions, the zero refractive index characteristic at a specific frequency point can be realized. Typically, the dimension of the metamaterial structure is not larger than a half of the dielectric wavelength, and the distribution of the multiple metamaterial structures is periodic.

In an exemplary implementation, as shown in FIG. 1*a*, FIG. 1*c* and FIG. 6A-FIG. 6*b*, the radiation structure 130 may further include a third edge D3 and a fourth edge D4 disposed oppositely along the second direction Y in the plane where the second conductive layer 13 is located. On the plane where the second conductive layer 13 is located, the radiation structure 130 is provided with multiple flow suppression grooves 134. The flow suppression grooves 134 may include multiple first flow suppression grooves 1341 arranged along the first direction X and multiple second flow suppression grooves 1342 arranged along the first direction X. The multiple first flow suppression grooves 1341 and the multiple second flow suppression grooves 1342 are symmetrically disposed with respect to the centerline of the antenna in the first direction X. The multiple first flow suppression grooves 1341 are disposed at a side of the third slot 1313, and the multiple second flow suppression grooves 1342 are disposed at a side of the third slot 1313 away from the multiple first flow suppression grooves 1341. The first suppression grooves 1341 extend to the third edge D3, and the second suppression grooves 1342 extend to the fourth edge D4.

In an exemplary implementation, extension directions of the first flow suppression grooves 1341 and the second flow suppression grooves 1342 are perpendicular to the centerline of the antenna along the first direction.

In an exemplary implementation, as shown in FIG. 1*a*, FIG. 1*c*, and FIG. 6*a*-FIG. 6*b*, a shape of a flow suppression groove 134 is rectangular; on the plane where the second conductive layer 13 is located, a dimension of the flow suppression groove 134 along the second direction Y satisfies the following formula: 0.25*λg/sqrt(ε0), wherein λg is a wavelength of the antenna's low-frequency dielectric frequency, ε0 is the dielectric constant of the dielectric plate, and sqrt (ε0) is an arithmetic square root of the dielectric constant ε0 of the dielectric plate.

In an exemplary implementation, in the plane where the second conductive layer 13 is located, the flow suppression groove 134 has a dimension of 4.5 mm to 5.5 mm along the second direction Y, and the flow suppression groove 134 has a dimension of 0.5 mm to 1.5 mm along the first direction X. For example, in the plane where the second conductive layer 13 is located, the flow suppression groove 134 has a dimension of 5 mm along the second direction Y, and the flow suppression groove 134 has a dimension of 1 mm along the first direction X.

Figure 8A:
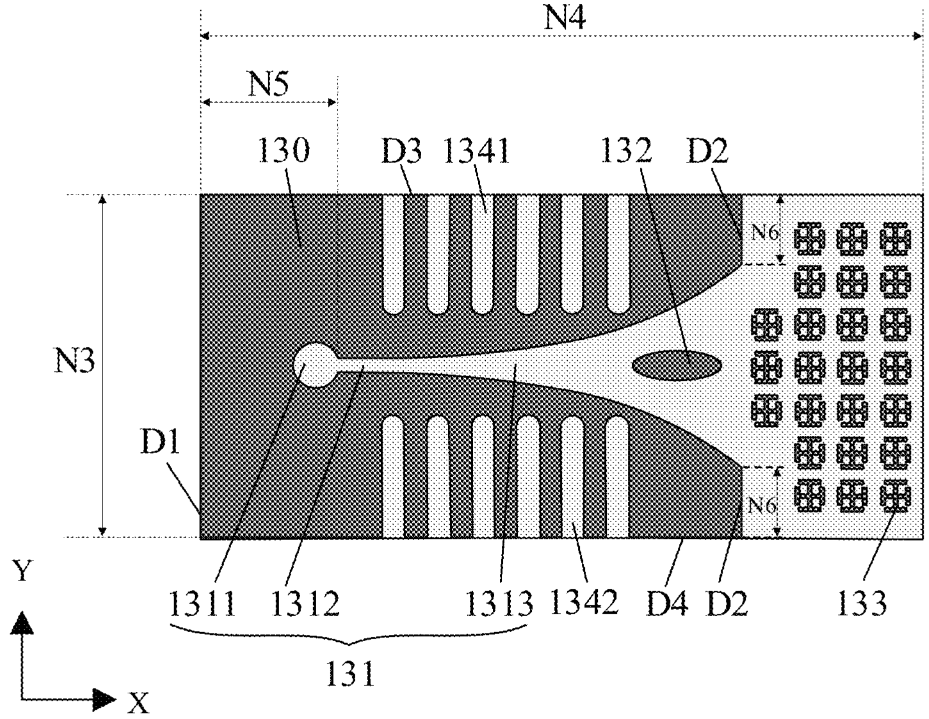
FIG. 8*a* is a schematic diagram of a planar structure of an antenna located at a side of a second conductive layer according to an exemplary embodiment of the present disclosure.
Figure 8B:
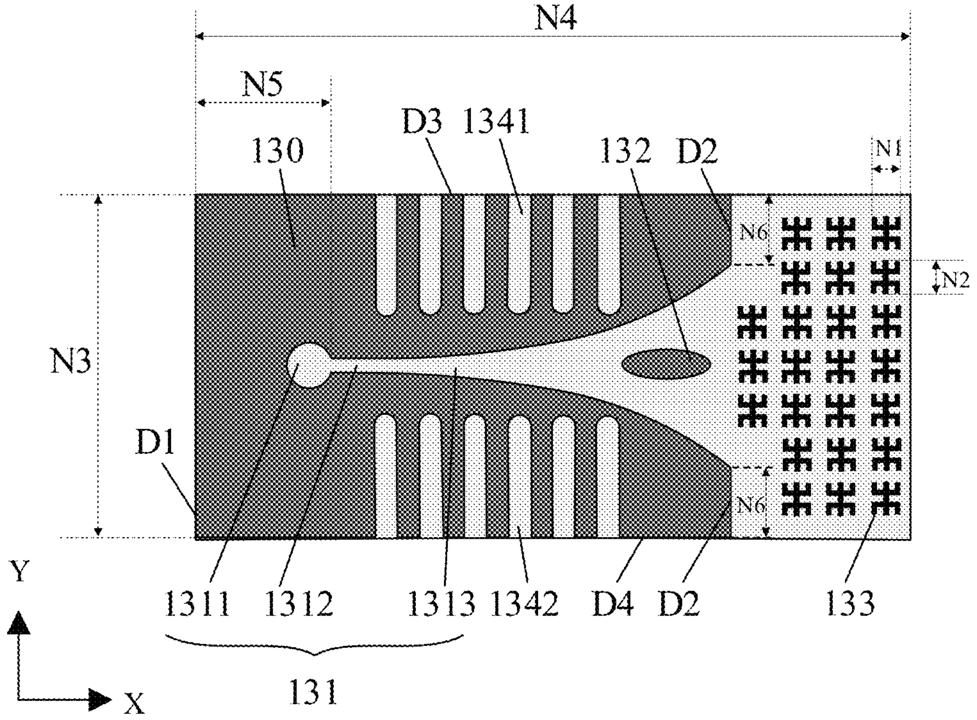
FIG. 8*b* is a schematic diagram of a planar structure of an antenna located at a side of a second conductive layer according to an exemplary embodiment of the present disclosure.
Figure 8C:
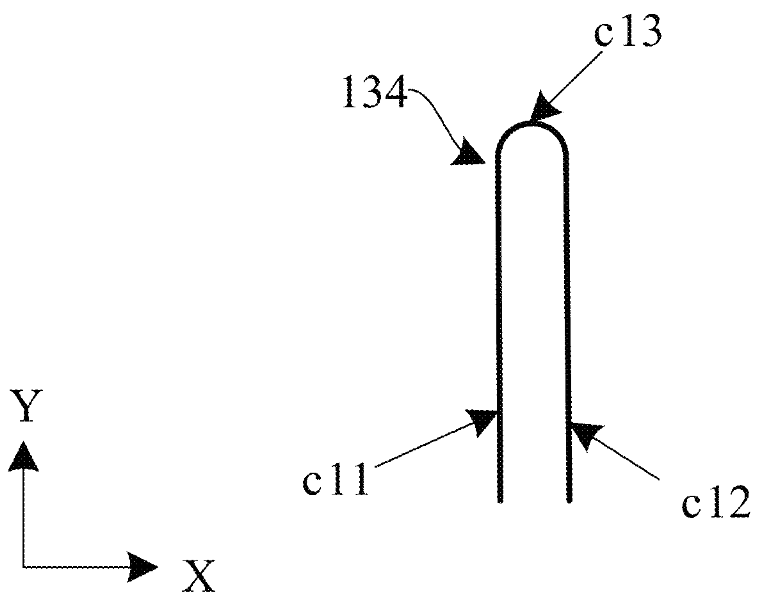
FIG. 8*c* is a schematic diagram of a planar structure of a flow suppression groove according to an exemplary embodiment of the present disclosure.

In an exemplary implementation, as shown in FIG. 8*a*-FIG. 8*c*, in the plane where the second conductive layer 13 is located, any one of the flow suppression grooves 134 may include a first groove edge c11, a second groove edge c12, and a third groove edge c13. A shape of the first groove edge c11 and the second groove edge c12 is a straight line extending along the second direction, a shape of the third groove edge c13 is an arc projecting toward the radiation slot 131, two ends of the third groove edge c13 are respectively connected with one end of the first groove edge c11 and one end of the second groove edge c12 close to the radiation slot 131.

As shown in FIG. 8*a* and FIG. 8*b*, in a first flow suppression groove 1341, one end of the first groove edge c11 and one end of the second groove edge c12 are respectively connected with two ends of the third groove edge c13, and the other end of the first groove edge c11 and the other end of the second groove edge c12 extend to the third edge D3 of the radiation structure 130. In a second flow suppression groove 1324, one end of the first groove edge c11 and one end of the second groove edge c12 are respectively connected with two ends of the third groove edge c13, and the other end of the first groove edge c11 and the other end of the second groove edge c12 extend to the fourth edge D4 of the radiation structure 130. In an exemplary implementation, the first groove edge c12 and the second groove edge c13 are parallel to each other in the plane where the second conductive layer 13 is located.

In the embodiment of the present disclosure, the flow suppression slots 134 are disposed on the second conductive layer 13. The flow suppression slots 134 are mainly used for suppressing the current backflow on the antenna surface, so that the radiation of the antenna is superposition of the radiation from the flow suppression slots 134 and the radiation from the radiation slot 131. Since such two kinds of radiation have end-fire effect, the gain of the antenna is increased. The length of a rectangular groove satisfies 0.25*λ g/sqrt (ε0), where λ g is the wavelength of the antenna's low-frequency dielectric frequency, ε0 is the dielectric constant of the dielectric plate, and sqrt (ε0) is the arithmetic square root of the dielectric constant ε0 of the dielectric plate. The number and spacing of the flow suppression slots 134 can satisfy requirements the antenna, which is not limited in the embodiments of the present disclosure.

In an exemplary implementation, the director 132 may be symmetrical with respect to the centerline along the first direction X.

Figure 9:
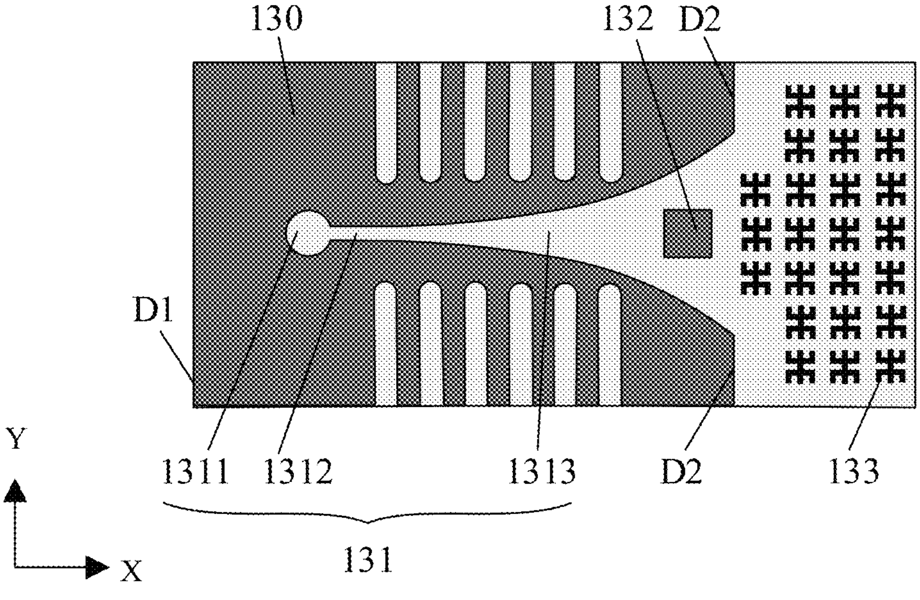
FIG. 9 is another schematic diagram of a planar structure of an antenna located at a side of a second conductive layer according to an exemplary embodiment of the present disclosure.

In an exemplary implementation, as shown in FIG. 9, the shape of the director 132 is rectangular and the rectangular director 132 is disposed symmetrically with respect to the first centerline, wherein the first centerline is the centerline of the antenna along the first direction X.

Alternatively, as shown in FIG. 8*a*, the shape of the director 132 is elliptical and the elliptical director 132 is disposed symmetrically with respect to the first centerline;

- alternatively, as shown in FIG. 7*a*, the shape of the director 132 is circular and the circular director 132 is disposed symmetrically with respect to the first centerline;
- alternatively, as shown in FIG. 6*a* and FIG. 6*b*, the shape of the director 132 is isosceles triangular, and the isosceles triangular director 132 is disposed symmetrically with respect to the first centerline, an apex angle of the isosceles triangle is located between the radiation slot 131 and a bottom edge of the isosceles triangle, a length of the bottom edge k1 of the isosceles triangle is 1.8 mm to 2.2 mm, and a length of the waists k2 of the isosceles triangle is 2 mm to 4 mm. For example, the bottom edge k1 of the isosceles triangle has a length of 2 mm, and the waists k2 of the isosceles triangle has a length of 2.24 mm.

Figure 10A:
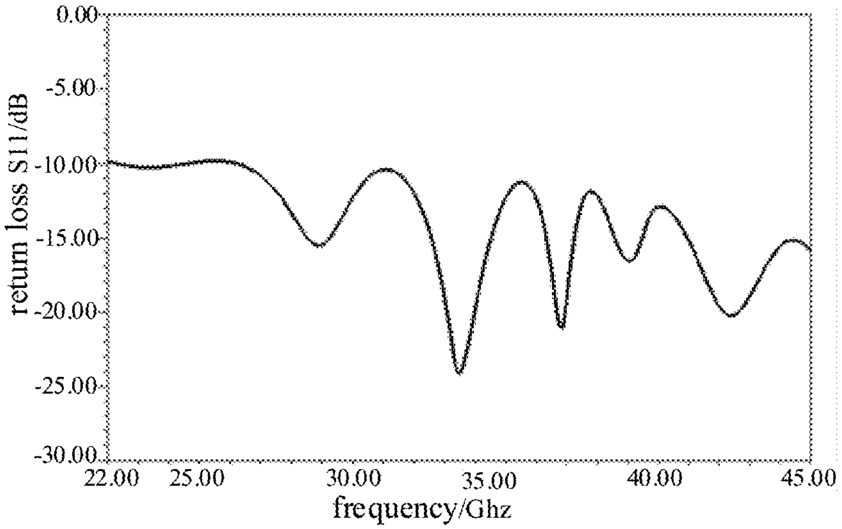
FIG. 10*a* is a diagram showing simulation results of a return loss of the antenna shown in FIG. 6*a* as a function of frequency.
Figure 10B:
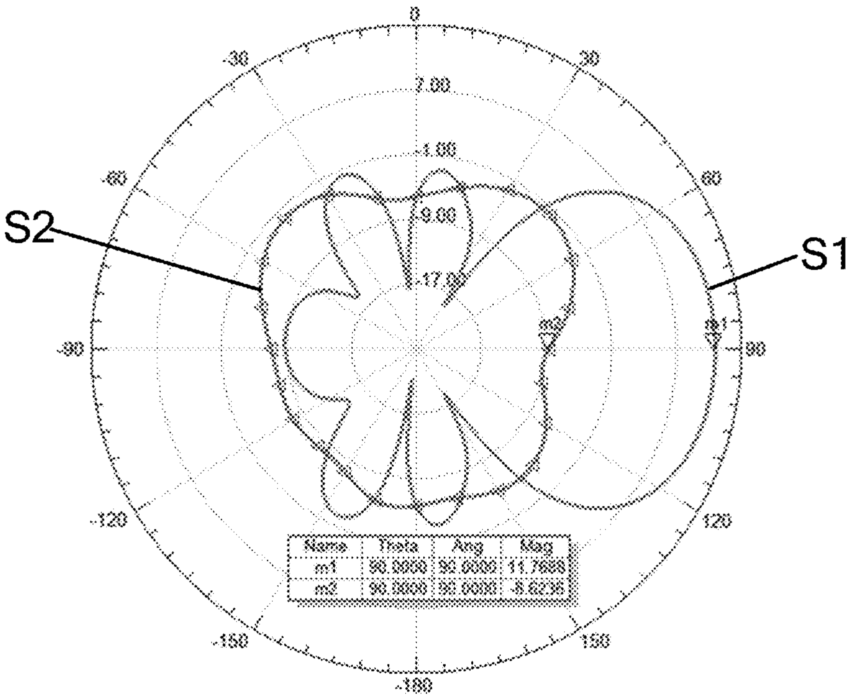
FIG. 10*b* to FIG. 10*e* are respectively simulation results of gains of the antenna shown in FIG. 6*a* at different frequencies.
Figure 10C:
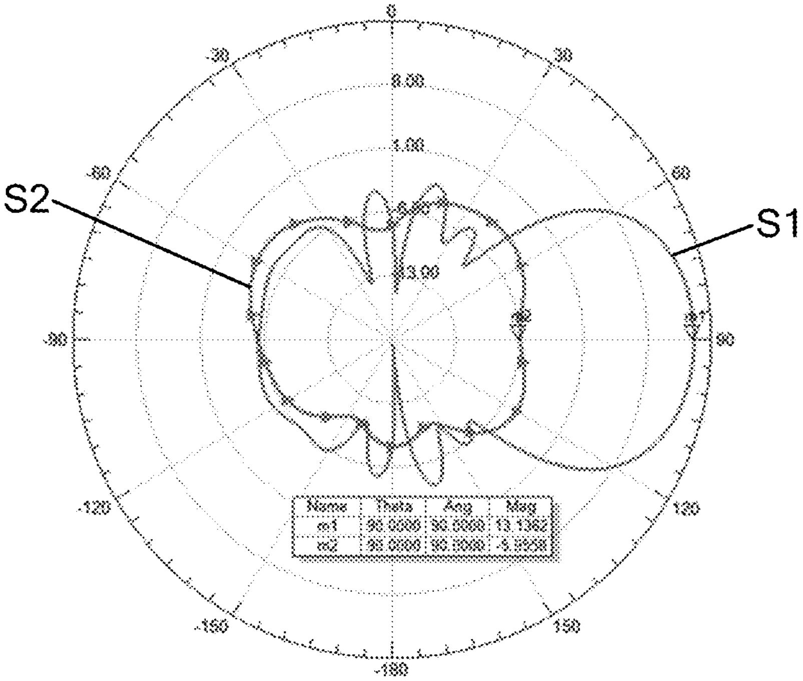
Figure 10D:
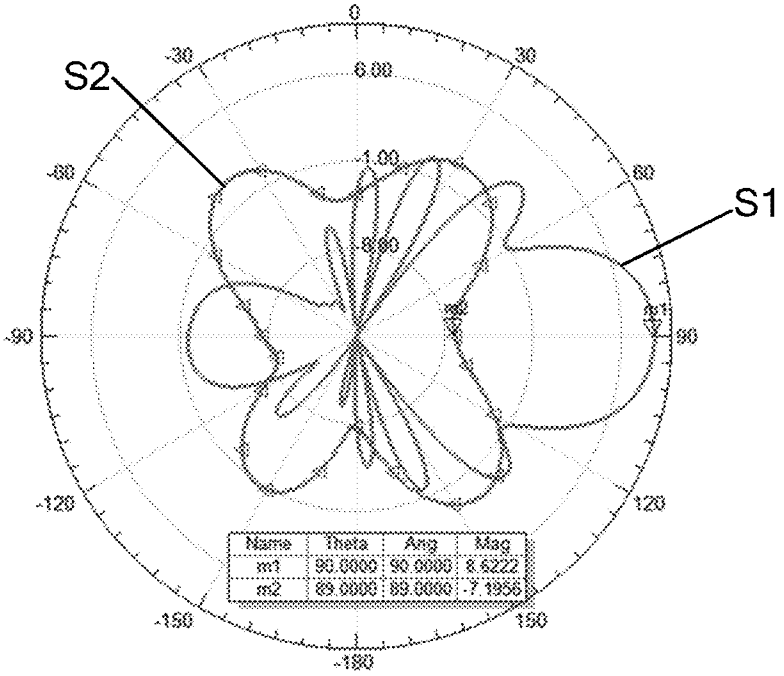
Figure 10E:
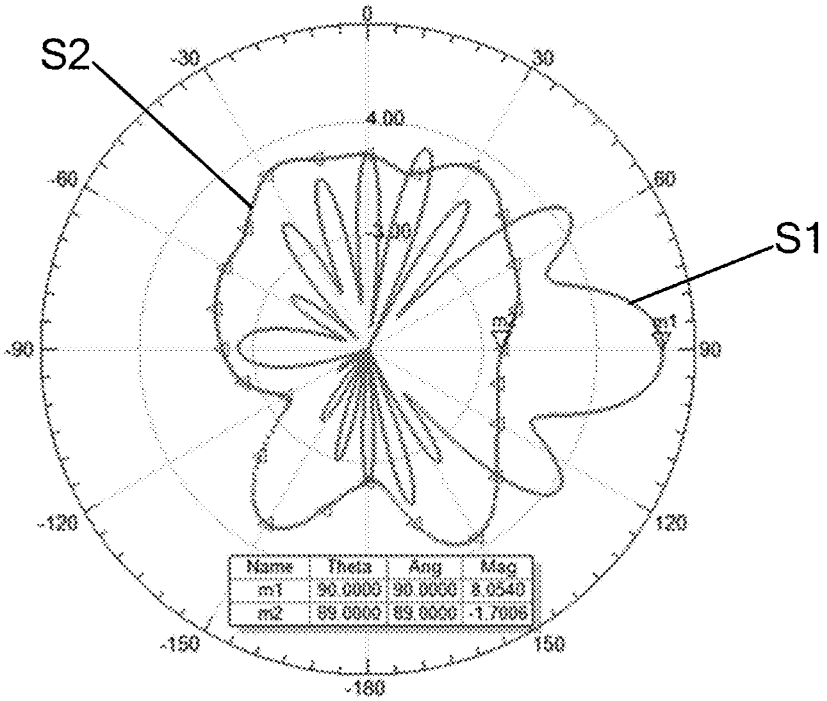

As shown in FIG. 10*a*, and FIG. 10*a* is a simulation result diagram of a return loss of the antenna shown in FIG. 6*a* as function of frequency. Curves S1 in FIG. 10*b* to FIG. 10*e* are respectively E-plane patterns of the Viadldi antenna shown in FIG. 6*a* at 25 GHz, 30 GHz, 35 GHz, and 40 Ghz, and curves S2 in FIG. 10*b* to FIG. 10*e* are respectively H-plane patterns of the Viadldi antenna shown in FIG. 6*a* at 25 GHz, 30 GHz, 35 GHz, and 40 Ghz. It can be seen from FIG. 10*a* to FIG. 10*e* that the antenna shown in FIG. 6*a* works at a frequency from 22 GHz to 45 GHz, with the return loss S11<−10 dB. On the curve S1, the antenna has a gain of 11.8 dB at 25 GHz, 13.1 dB at 30 GHz, 8.6 dB at 35 GHz and 8.0 dB at 40 GHz.

Figure 11A:
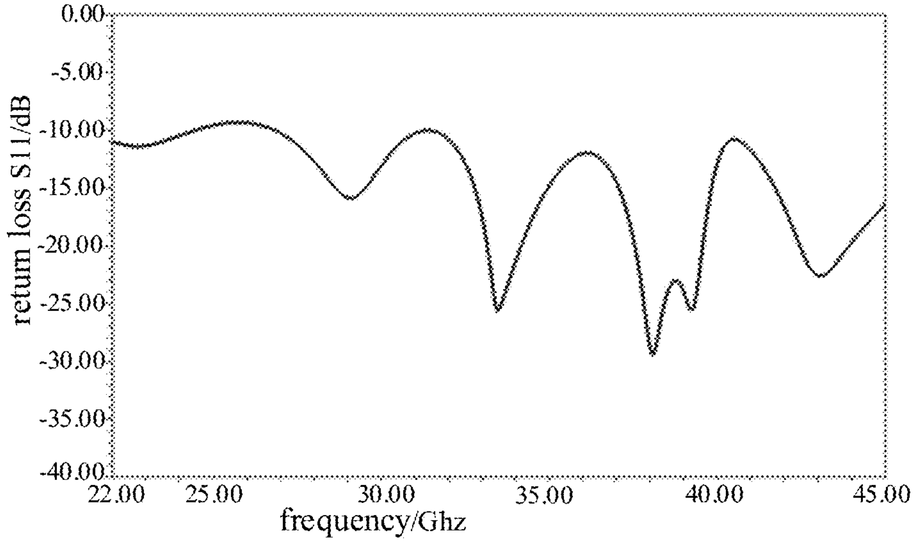
FIG. 11*a* is a diagram showing simulation results of a return loss of the antenna shown in FIG. 7*a* as a function of frequency.
Figure 11B:
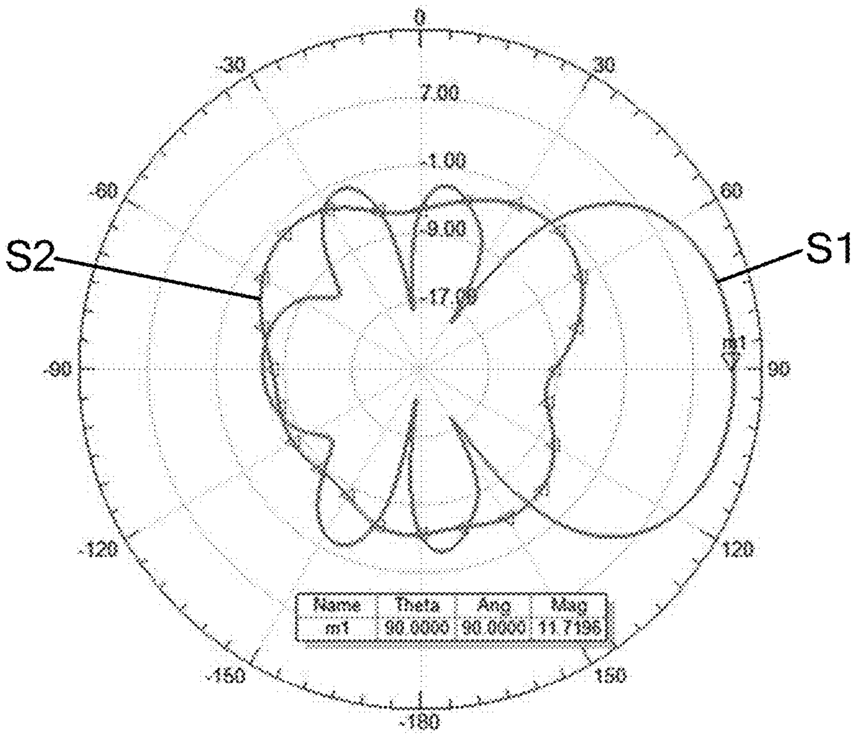
FIG. 11*b* to FIG. 11*e* are respectively simulation results of gains of the antenna shown in FIG. 7*a* at different frequencies.
Figure 11C:
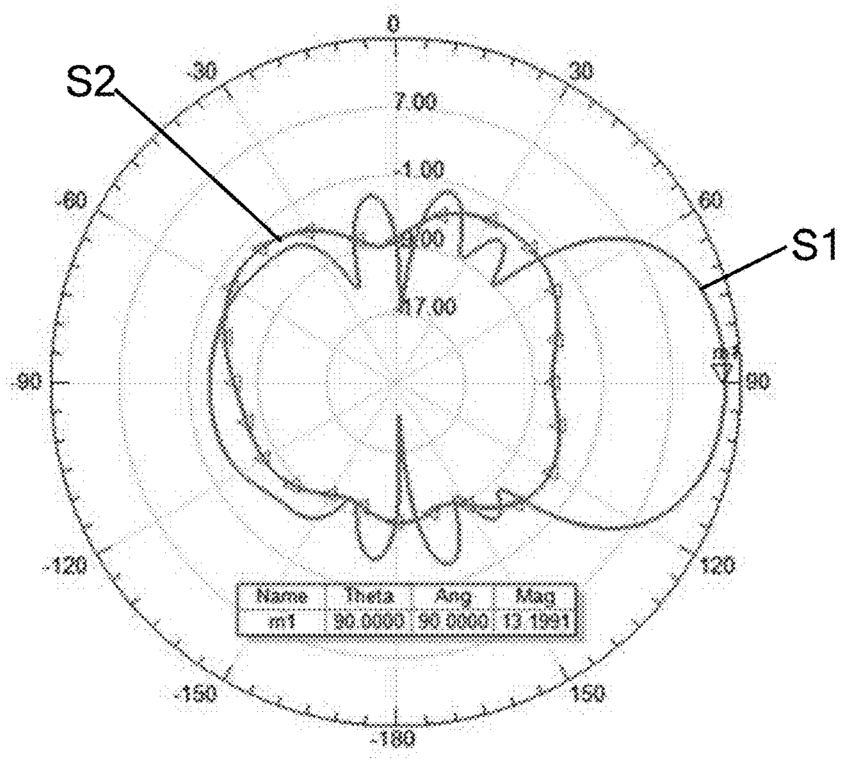
Figure 11D:
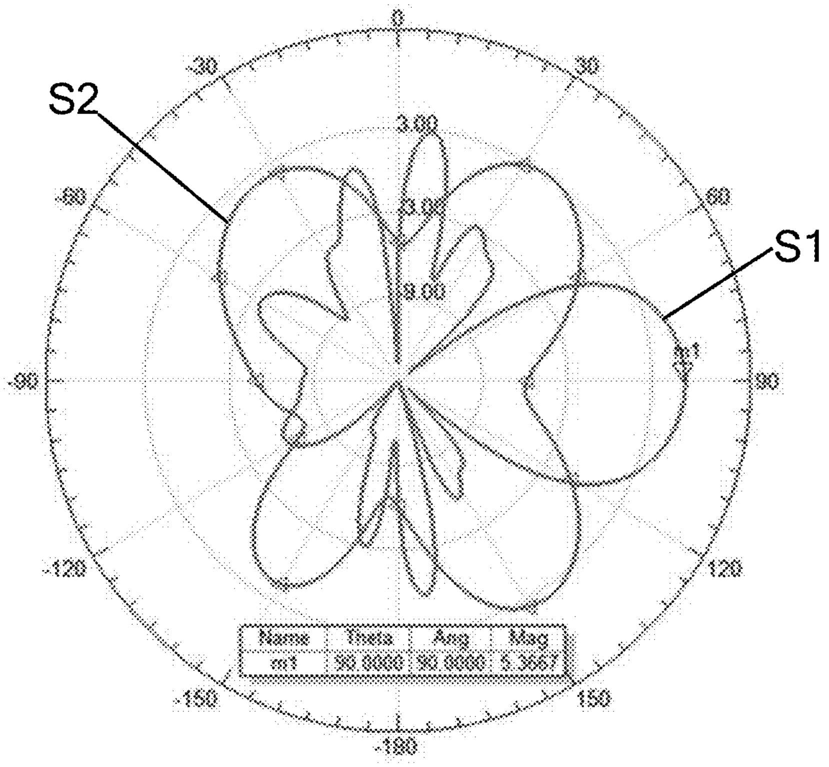
Figure 11E:
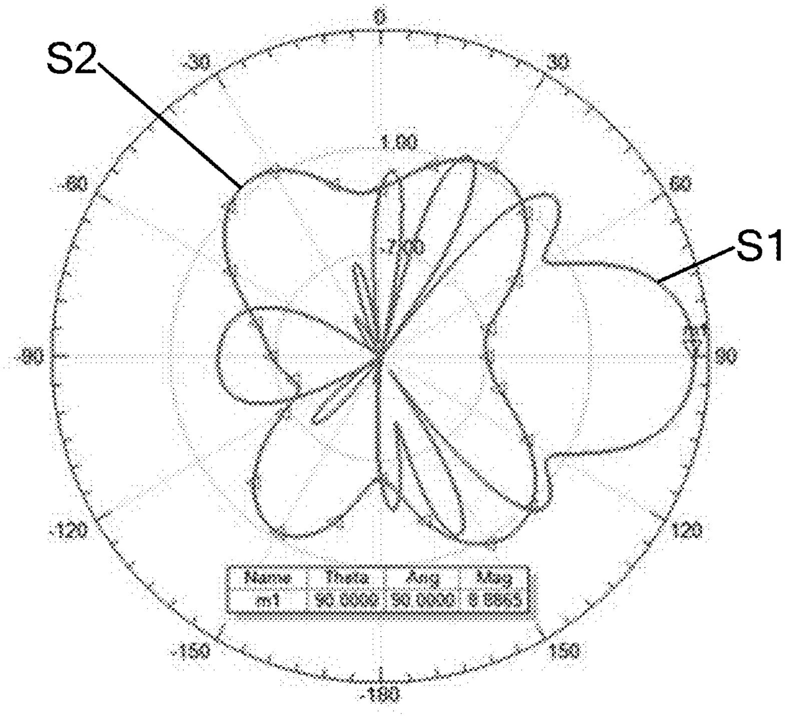

As shown in FIG. 11*a*, and FIG. 11*a* is a simulation result diagram of a return loss of the antenna shown in FIG. 7*a* as function of frequency. Curves S1 in FIG. 11*b* to FIG. 11*e* are respectively E-plane patterns of the Viadldi antenna shown in FIG. 7*a* at 25 GHz, 30 GHz, 35 GHz, and 40 Ghz, and curves S2 in FIG. 11*b* to FIG. 11*e* are respectively H-plane patterns of the Viadldi antenna shown in FIG. 7*a* at 25 GHz, 30 GHz, 35 GHz, and 40 Ghz. It can be seen from FIG. 11*a* to FIG. 11*e* that the antenna shown in FIG. 7*a* works at a frequency from 22 GHz to 45 GHz, with the return loss S11<−11 dB. On the curve S1, the antenna has a gain of 11.7 dB at 25 GHz, 13.2 dB at 30 GHz, 5.4 dB at 35 GHz and 8.8 dB at 40 GHz.

Figure 12A:
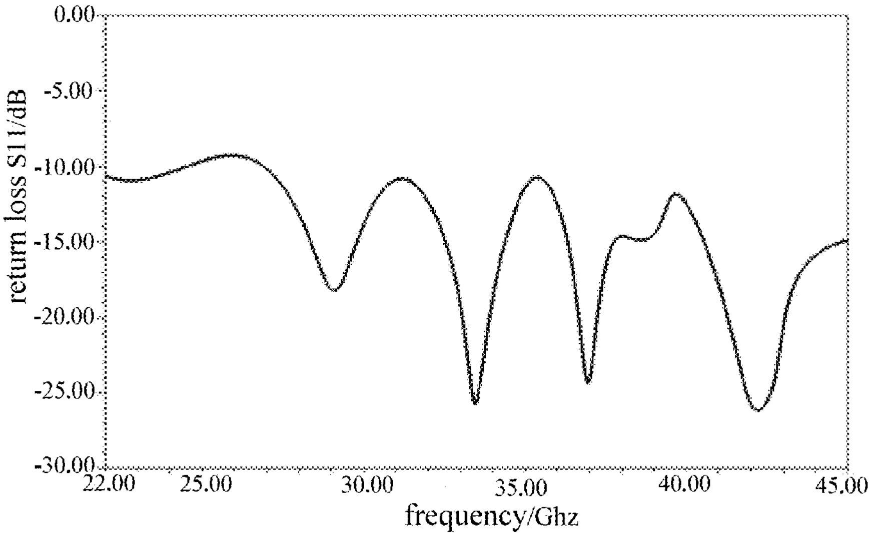
FIG. 12*a* is a diagram showing simulation results of a return loss of an antenna shown in FIG. 12*f* as a function of frequency.
Figure 12B:
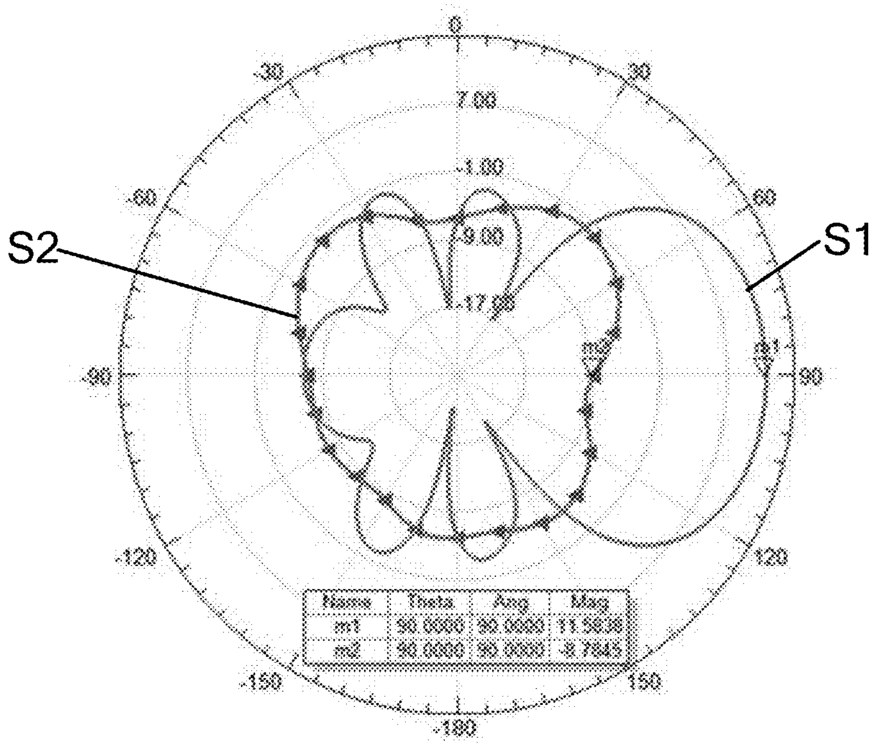
FIG. 12*b* to FIG. 12*e* are respectively simulation results of gains of the antenna shown in FIG. 12*f* at different frequencies.
Figure 12C:
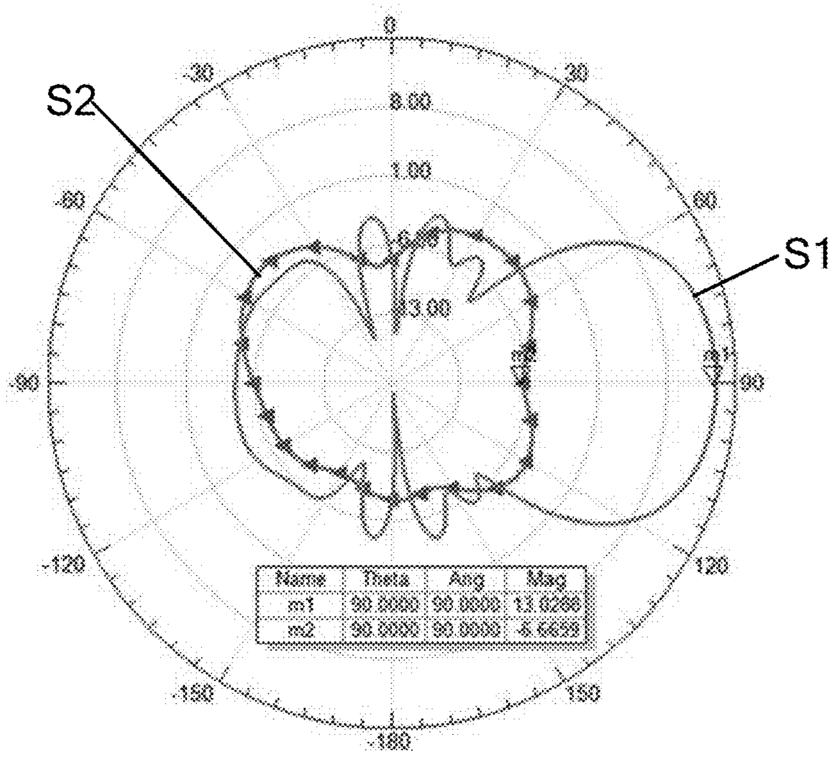
Figure 12D:
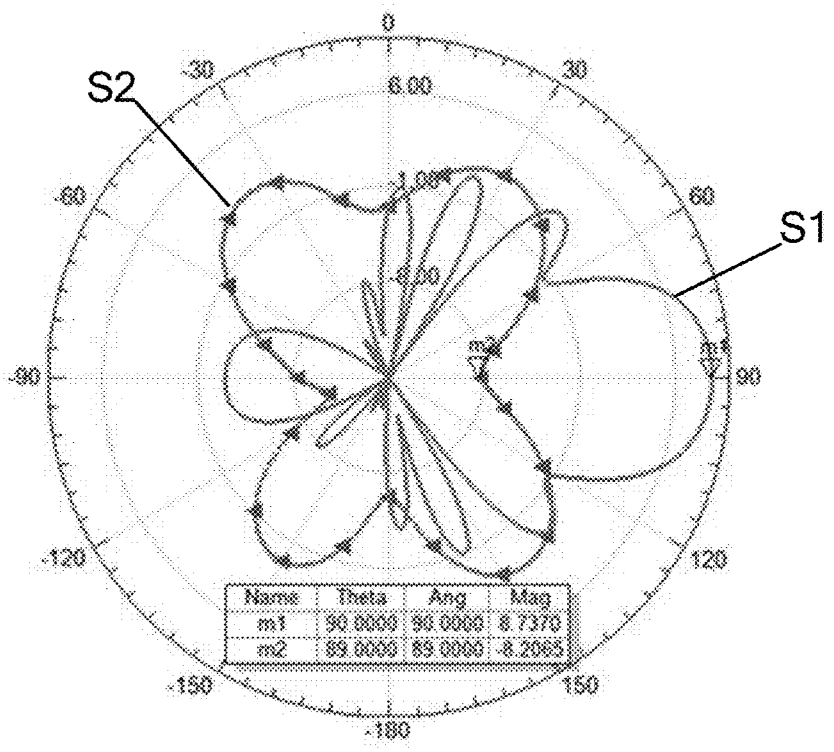
Figure 12E:
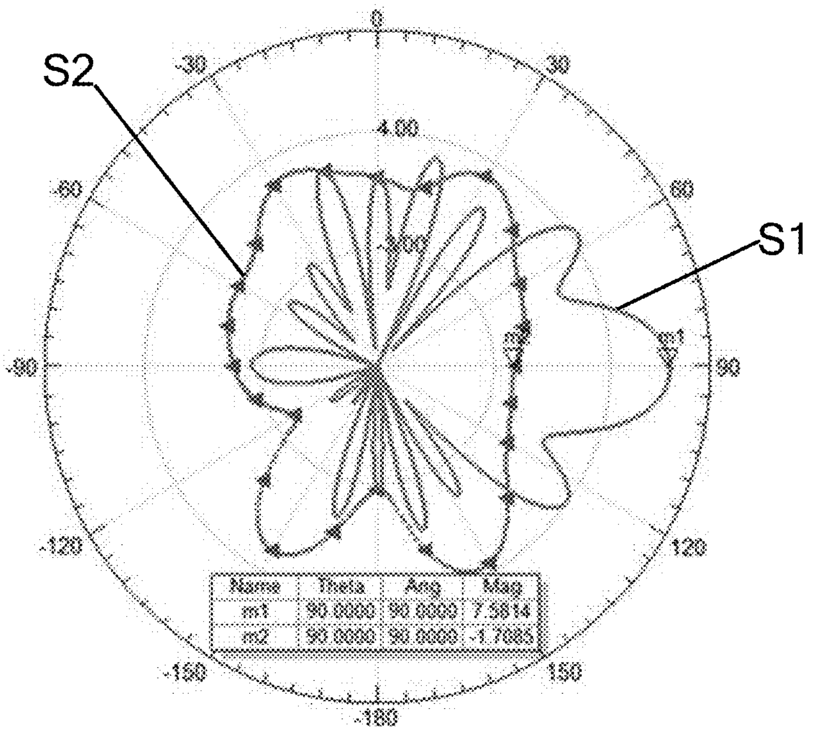
Figure 12F:
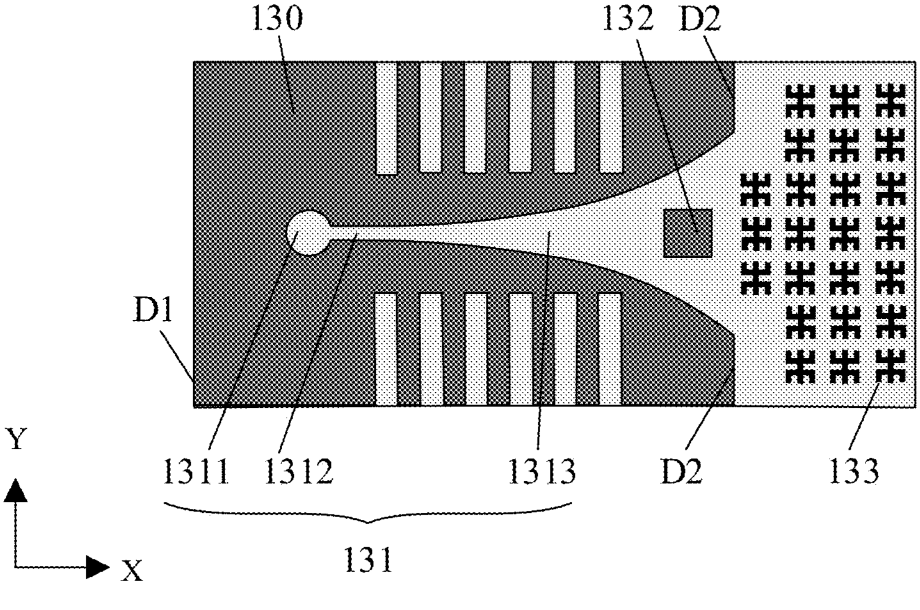
FIG. 12*f* is a schematic diagram of a planar structure of an antenna located at a side of a second conductive layer according to an exemplary embodiment of the present disclosure.

As shown in FIG. 12*a*, and FIG. 12*a* is a simulation result diagram of a return loss of the antenna shown in FIG. 12*f* as function of frequency. Curves S1 in FIG. 12*b* to FIG. 12*e* are respectively E-plane patterns of the Viadldi antenna shown in FIG. 12*f* at 25 GHz, 30 GHz, 35 GHz, and 40 Ghz, and curves S2 in FIG. 12*b* to FIG. 12*e* are respectively H-plane patterns of the Viadldi antenna shown in FIG. 12*f* at 25 GHz, 30 GHz, 35 GHz, and 40 Ghz. It can be seen from FIG. 12*a* to FIG. 12*e* that the antenna shown in FIG. 12*f* works at a frequency from 22 GHz to 45 GHz, with the return loss S12<−11 dB. On the curve S1, the antenna has a gain of 11.6 dB at 25 GHz, 13.03 dB at 30 GHz, 8.7 dB at 35 GHz and 7.58 dB at 40 GHz.

Figure 13A:
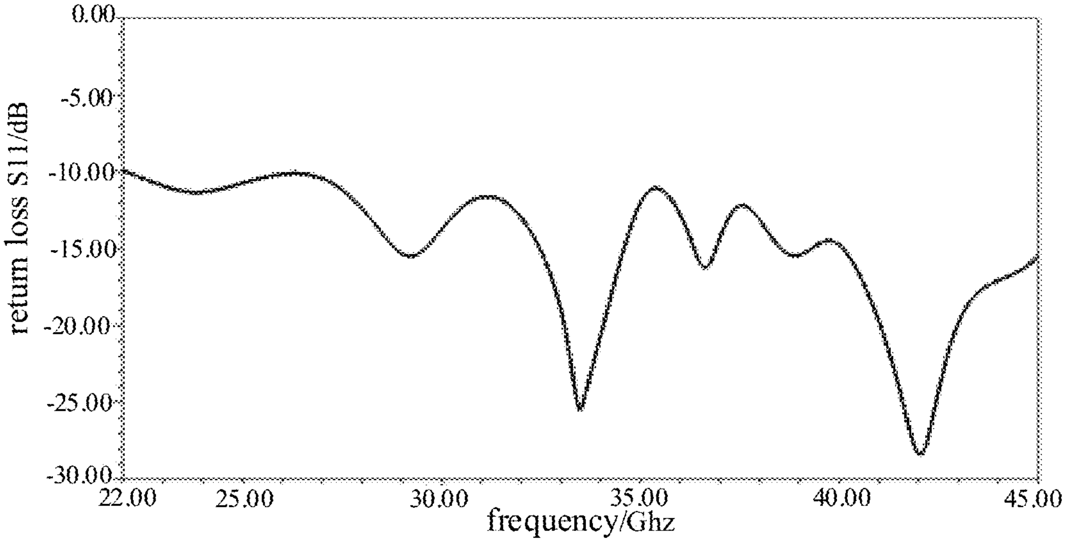
FIG. 13*a* is a diagram showing simulation results of a return loss of an antenna shown in FIG. 13*f* as a function of frequency.
Figure 13B:
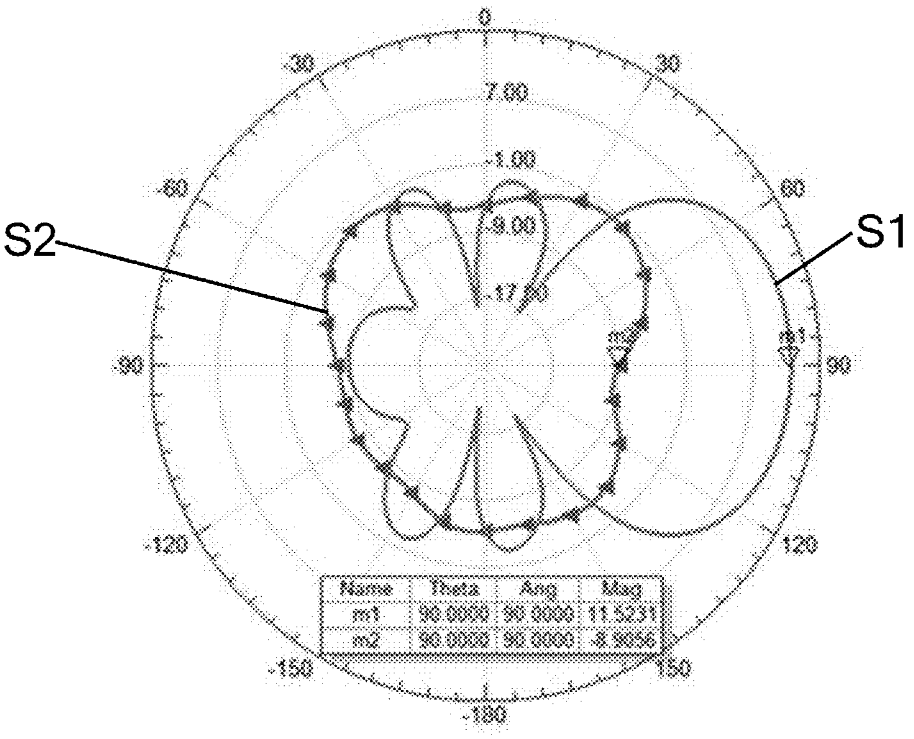
FIG. 13*b* to FIG. 13*e* are respectively simulation results of gains of the antenna shown in FIG. 13*f* at different frequencies.
Figure 13C:
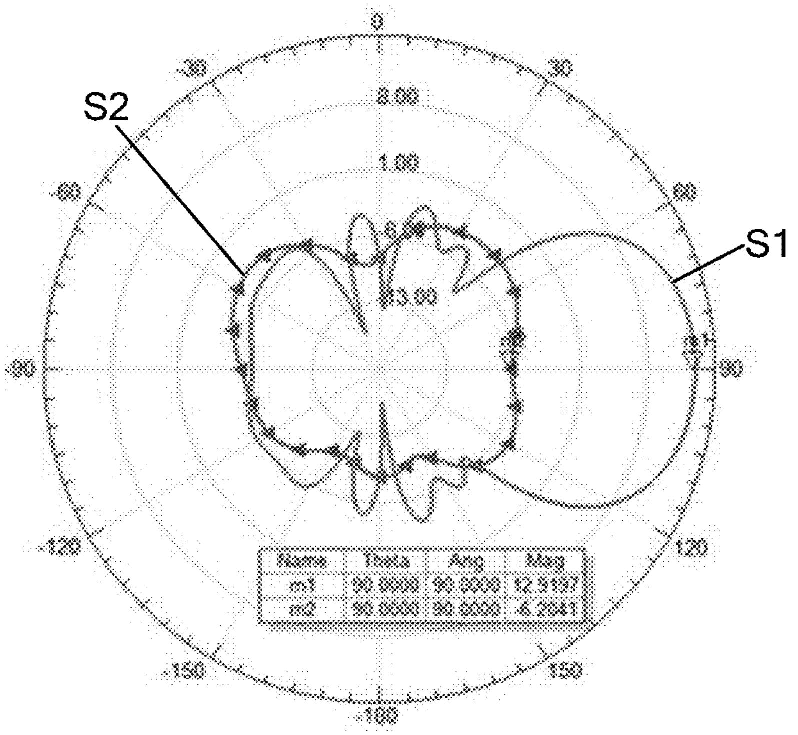
Figure 13D:
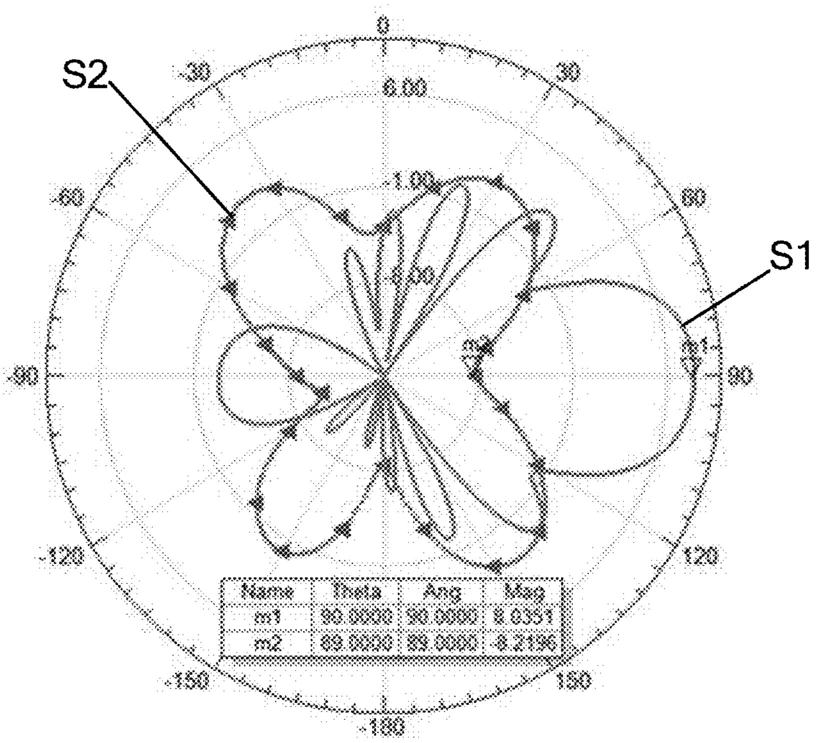
Figure 13E:
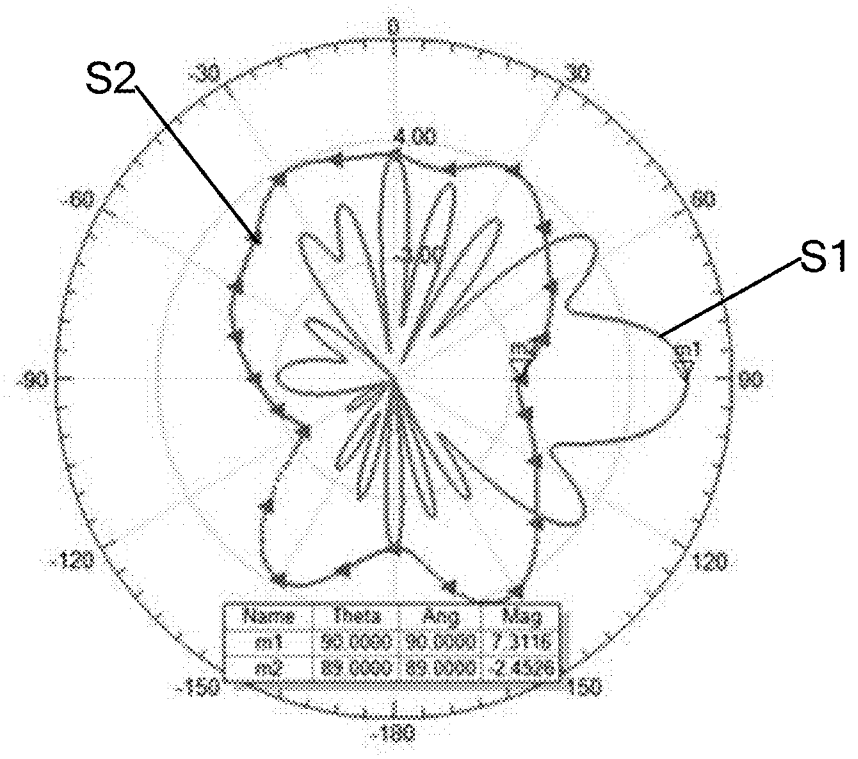
Figure 13F:
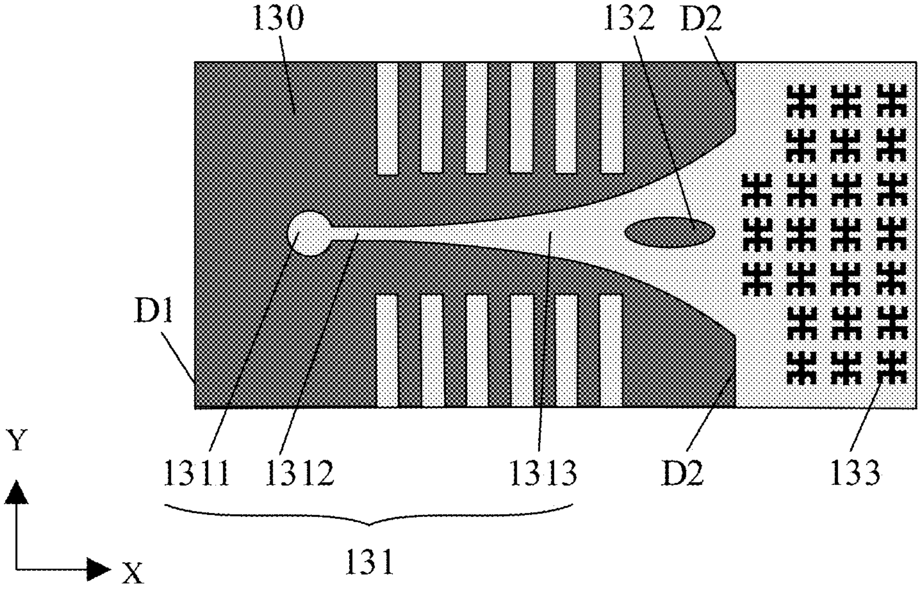
FIG. 13*f* is a schematic diagram of a planar structure of an antenna located at a side of a second conductive layer according to an exemplary embodiment of the present disclosure.

As shown in FIG. 13*a*, and FIG. 13*a* is a simulation result diagram of a return loss of the antenna shown in FIG. 13*f* as function of frequency. Curves S1 in FIG. 13*b* to FIG. 13*e* are respectively E-plane patterns of the Viadldi antenna shown in FIG. 13*f* at 25 GHz, 30 GHZ, 35 GHz, and 40 Ghz, and curves S2 in FIG. 13*b* to FIG. 13*e* are respectively H-plane patterns of the Viadldi antenna shown in FIG. 13*f* at 25 GHz, 30 GHz, 35 GHz, and 40 Ghz. It can be seen from FIG. 13*a* to FIG. 13*e* that the antenna shown in FIG. 13*f* works at a frequency from 22 GHz to 45 GHz, with the return loss S13<−10 dB. On the curve S1, the antenna has a gain of 11.5 dB at 25 GHz, 12.9 dB at 30 GHz, 8 dB at 35 GHz and 7.3 dB at 40 GHz.

Figure 14A:
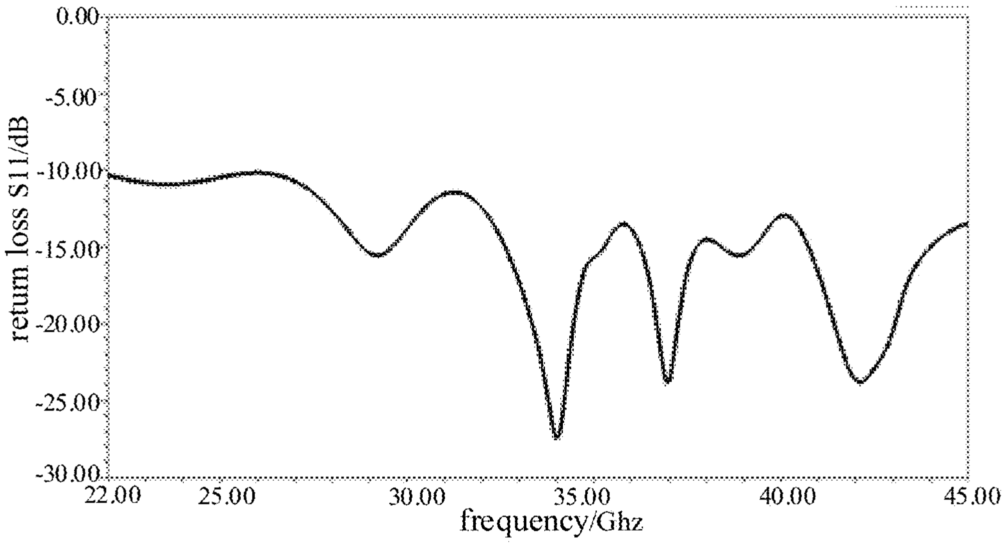
FIG. 14*a* is a diagram showing simulation results of a return loss of an antenna shown in FIG. 14*f* as a function of frequency.
Figure 14B:
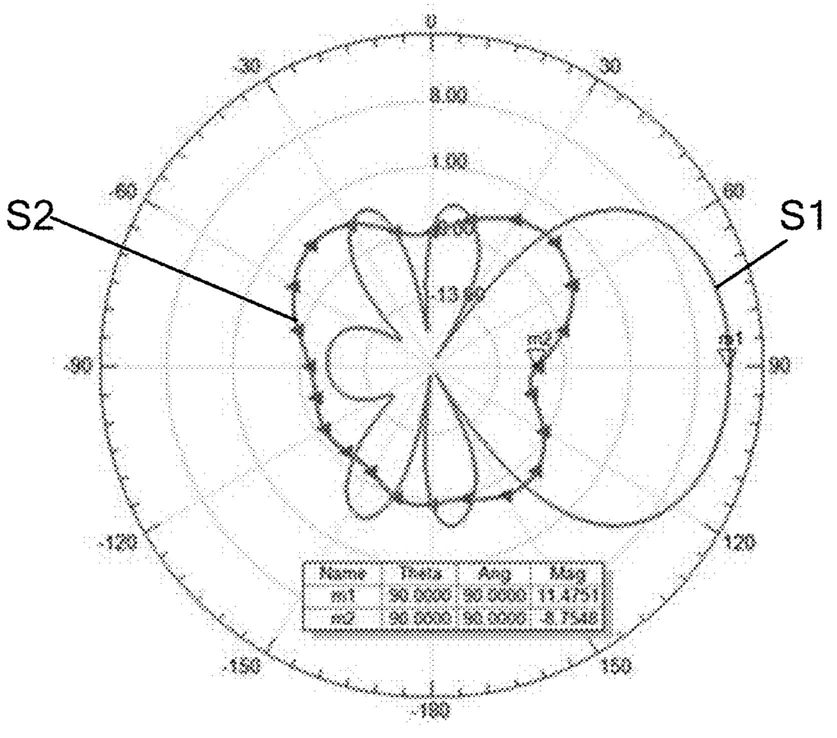
FIG. 14*b* to FIG. 14*e* are respectively simulation results of gains of the antenna shown in FIG. 14*f* at different frequencies.
Figure 14C:
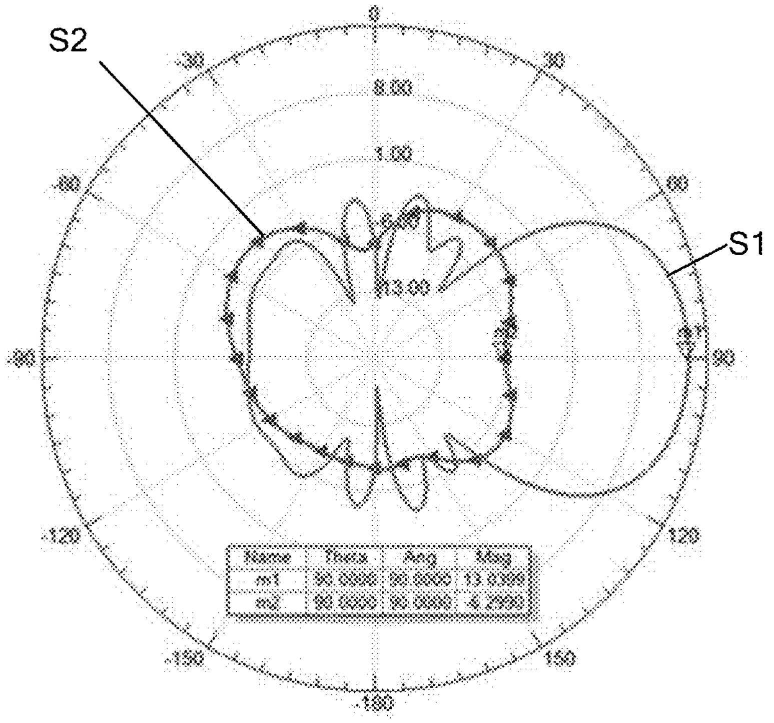
Figure 14D:
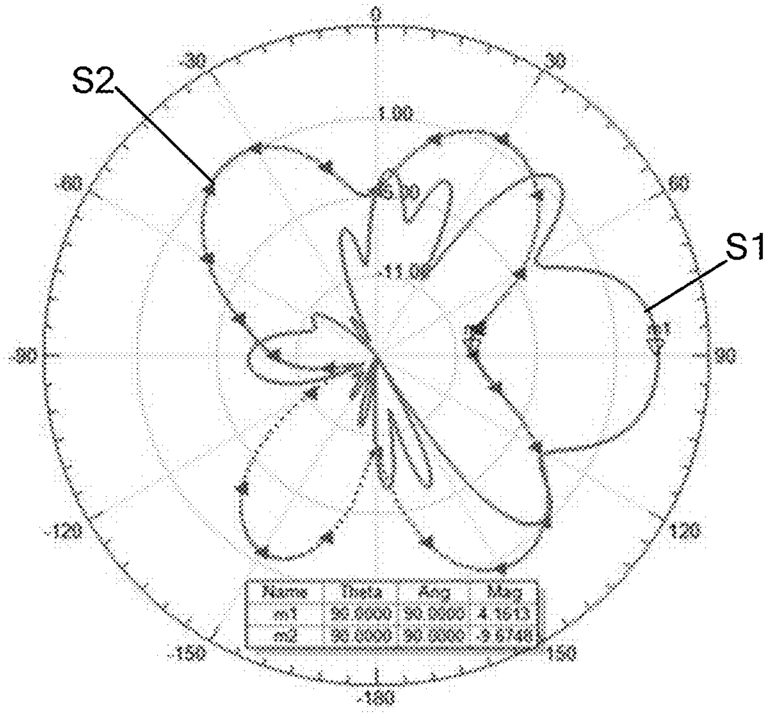
Figure 14E:
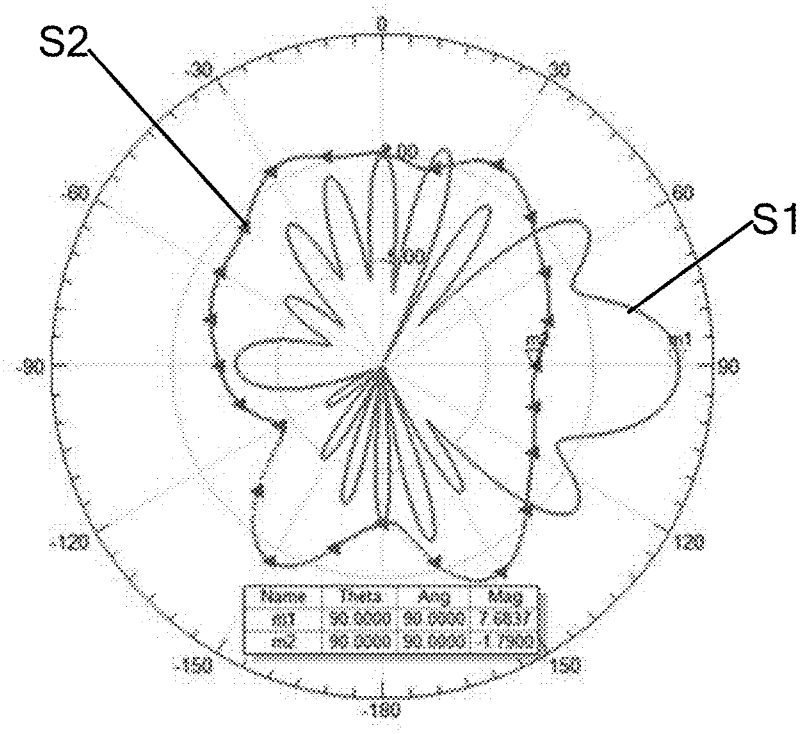
Figure 14F:
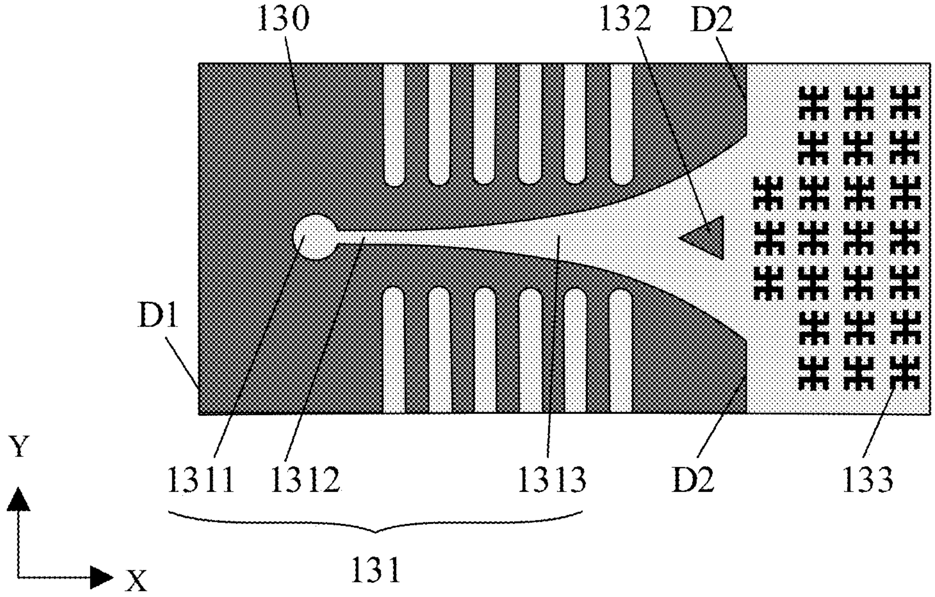
FIG. 14*f* is a schematic diagram of a planar structure of an antenna located at a side of a second conductive layer according to an exemplary embodiment of the present disclosure.

As shown in FIG. 14*a*, and FIG. 14*a* is a simulation result diagram of a return loss of the antenna shown in FIG. 14*f* as function of frequency. Curves S1 in FIG. 14*b* to FIG. 14*e* are respectively E-plane patterns of the Viadldi antenna shown in FIG. 14*f* at 25 GHz, 30 GHZ, 35 GHz, and 40 Ghz, and curves S2 in FIG. 14*b* to FIG. 14*e* are respectively H-plane patterns of the Viadldi antenna shown in FIG. 14*f* at 25 GHz, 30 GHz, 35 GHz, and 40 Ghz. It can be seen from FIG. 14*a* to FIG. 14*e* that the antenna shown in FIG. 14*f* works at a frequency from 22 GHz to 45 GHz, and with return loss S14<−10 dB. On the curve S1, the antenna has a gain of 11.5 dB at 25 GHz, 13.04 dB at 30 GHz, 4.2 dB at 35 GHz and 7.68 dB at 40 GHz.

Figure 15A:
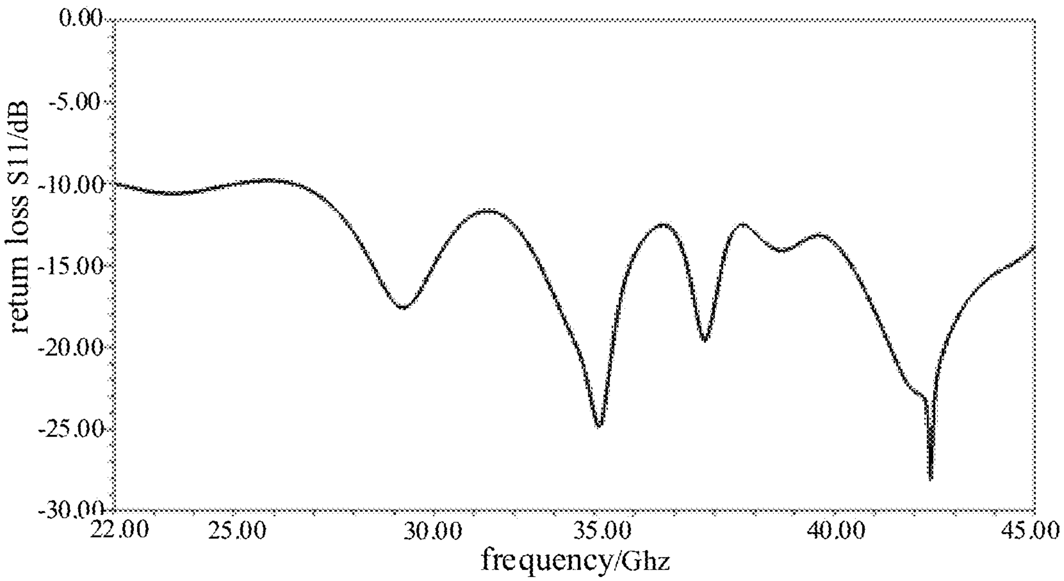
FIG. 15*a* is a diagram showing simulation results of a return loss of an antenna shown in FIG. 15*f* as a function of frequency.
Figure 15B:
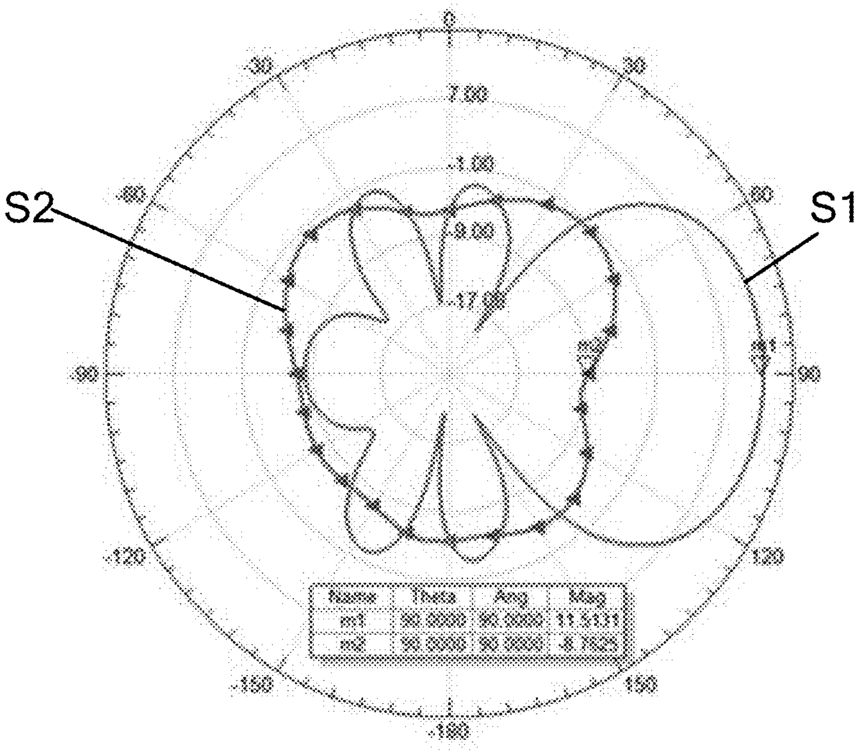
FIG. 15*b* to FIG. 15*e* are respectively simulation results of gains of the antenna shown in FIG. 15*f* at different frequencies.
Figure 15C:
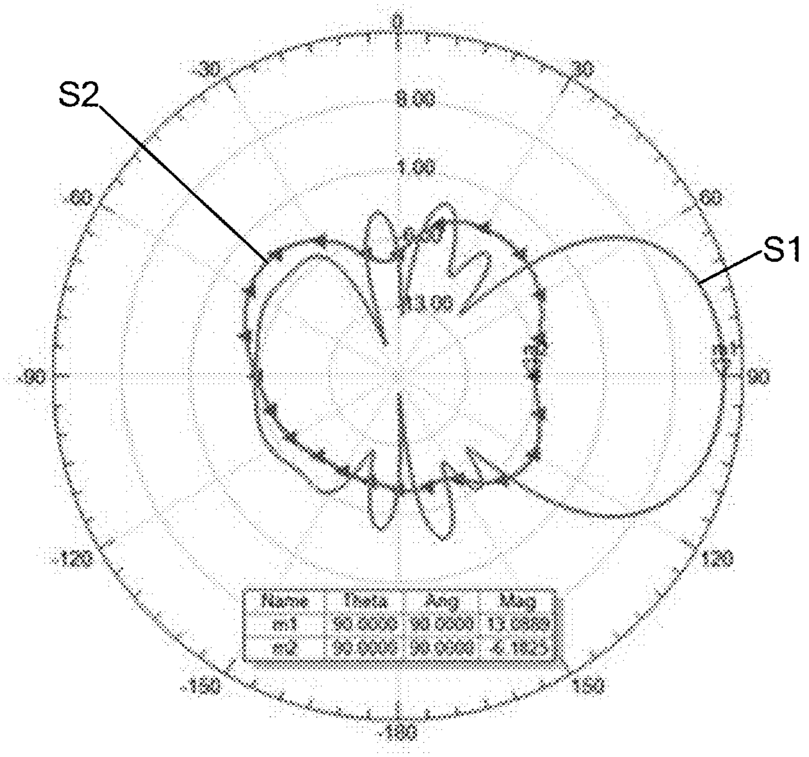
Figure 15D:
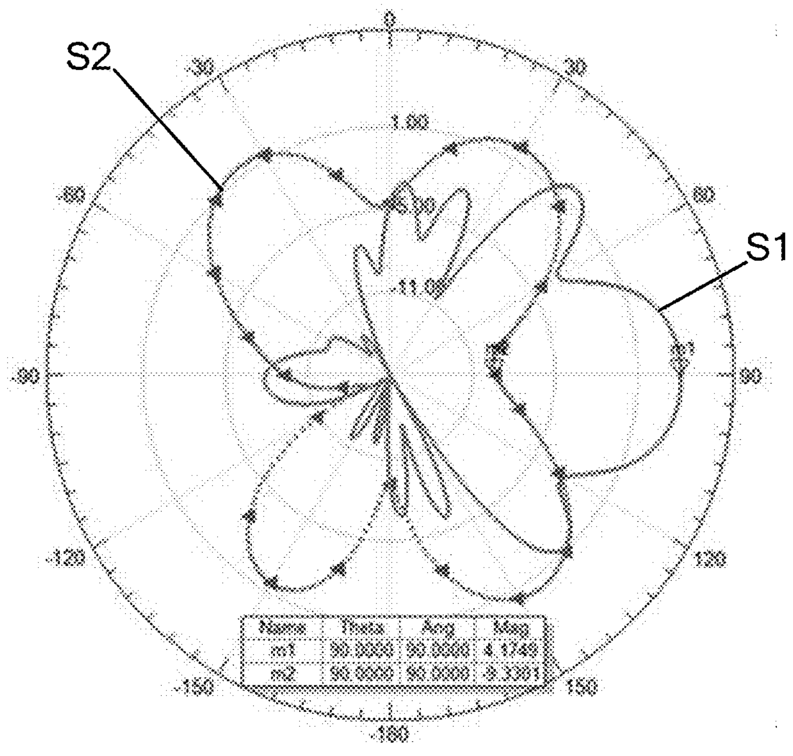
Figure 15E:
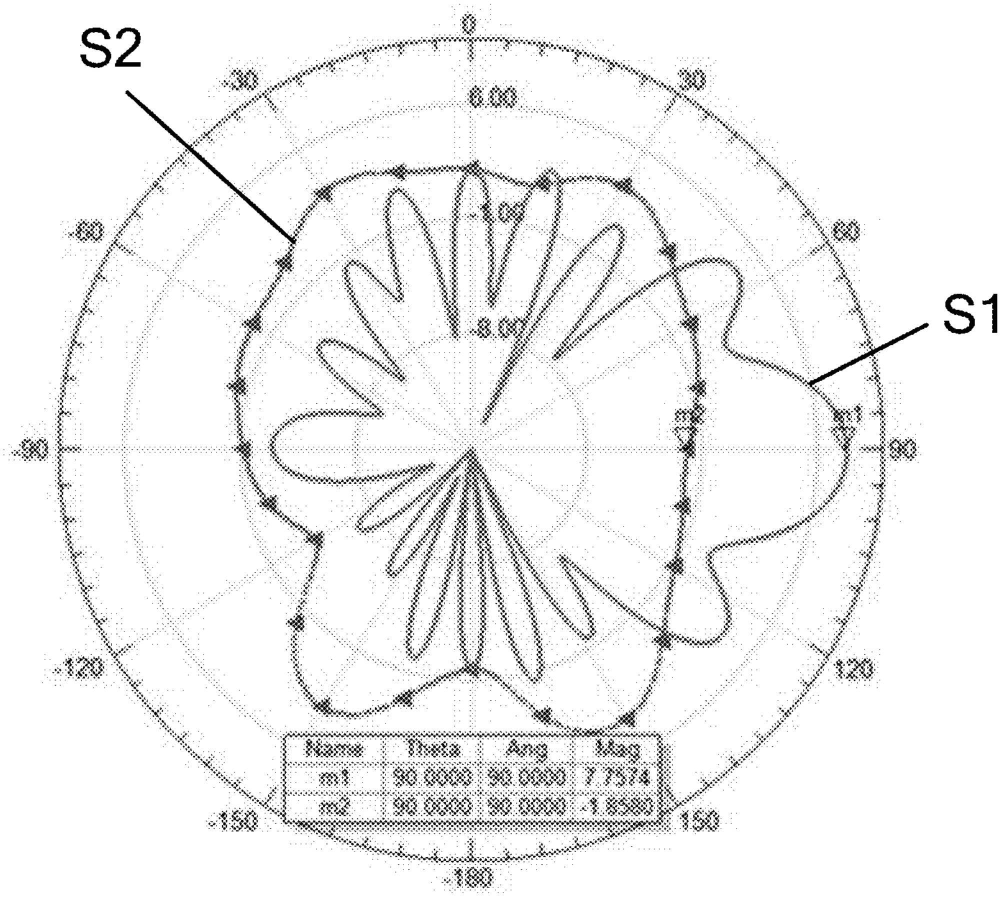
Figure 15F:
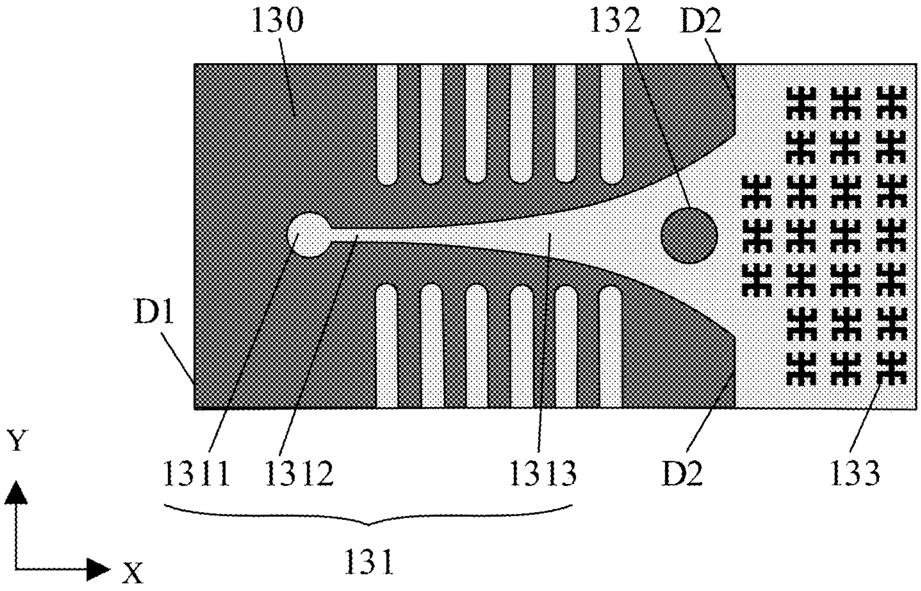
FIG. 15*f* is a schematic diagram of a planar structure of an antenna located at a side of the second conductive layer according to an exemplary embodiment of the present disclosure.

As shown in FIG. 15*a*, and FIG. 15*a* is a simulation result diagram of a return loss of the antenna shown in FIG. 15*f* as function of frequency. Curves S1 in FIG. 15*b* to FIG. 15*e* are respectively E-plane patterns of the Viadldi antenna shown in FIG. 15*f* at 25 GHz, 30 GHz, 35 GHz, and 40 Ghz, and curves S2 in FIG. 15*b* to FIG. 15*e* are respectively H-plane patterns of the Viadldi antenna shown in FIG. 15*f* at 25 GHz, 30 GHz, 35 GHz, and 40 Ghz. It can be seen from FIG. 15*a* to FIG. 15*e* that the antenna shown in FIG. 15*f* works at a frequency from 22 GHz to 45 GHz, with the return loss S15<−10 dB. On the curve S1, the antenna has a gain of 11.5 dB at 25 GHz, 13.04 dB at 30 GHz, 4.2 dB at 35 GHz and 7.68 dB at 40 GHz.

In the embodiment of the present disclosure, the larger the return loss of the antenna, the smaller the gain of the antenna, and the smaller the return loss of the antenna, the greater the gain of the antenna.

In the embodiment of the present disclosure, the S1 curve in FIG. 10 to FIG. 15 is an E-plane pattern of the antenna, and the S2 curve is an H-plane pattern of the antenna, wherein the E-plane may be referred to as an electric plane, referring to a directional plane parallel to the electric field direction, and the H plane may be referred to as a magnetic plane, meaning a directional plane parallel to the direction of magnetic field. In the drawings shown in FIG. 10 to FIG. 15, Mag may be gain of the antenna.

In the antenna according to an embodiment of the present disclosure, the second conductive layer 13 is provided with a director 132 and a radiation slot 131. The radiation slot 131 is provided as a first slot 1311, a second slot 1312, and a third slot 1313 which are communicated in sequence along a first direction X in a plane where the second conductive layer 13 is located. The director 132 is disposed on the second conductive layer 13 and located a side of the third slot 1313 away from the second slot 1312. An orthographic projection of the director 132 on the dielectric layer 12 is within a range of an orthographic projection of the third slot 1313 on the dielectric layer 12. The director 13 is disposed on the second conductive layer 13 and located at a side of the third slot 1313 away from the second slot 1312 and plays a guiding role on electromagnetic waves, thus improving the gain of the antenna to a great extent.

An embodiment of the present disclosure further provides an electronic device, which includes the antenna in any one of the embodiments described above.

In the embodiments of the present disclosure, since the above antenna is provided with the director 132 on the second conductive layer 13 located at the side of the third slot 1313 away from the second slot 1312, which plays a guiding role on electromagnetic waves, thus improving the gain of the antenna to a great extent, thereby the gain of the electronic device including the antenna is increased in the process of wireless communication through the antenna, and the communication effect of the electronic device is improved.

In the embodiments of the present disclosure, the electronic device may be any product or component having the antenna of any one of the above embodiments, such as a display device, a wearable device, radar, a satellite, or the like.

Figure 16:
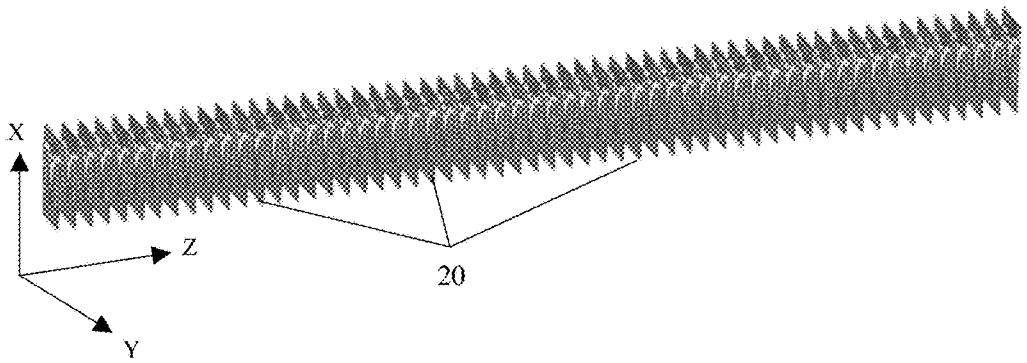
FIG. 16 is a schematic diagram of an antenna array structure according to an embodiment of the present disclosure.

In an exemplary implementation, as shown in FIG. 16, the electronic device may include multiple the antennas mentioned above, the plurality of antennas are arranged along a third direction Z to form an antenna array, and orthographic projections of the multiple antennas on a plane where the first direction X and the second direction Y are located are overlapped, and orthographic projections of the radiation slots in the multiple antennas on a plane where the first direction X and the second direction Y are located are overlapped.

Figure 17A:
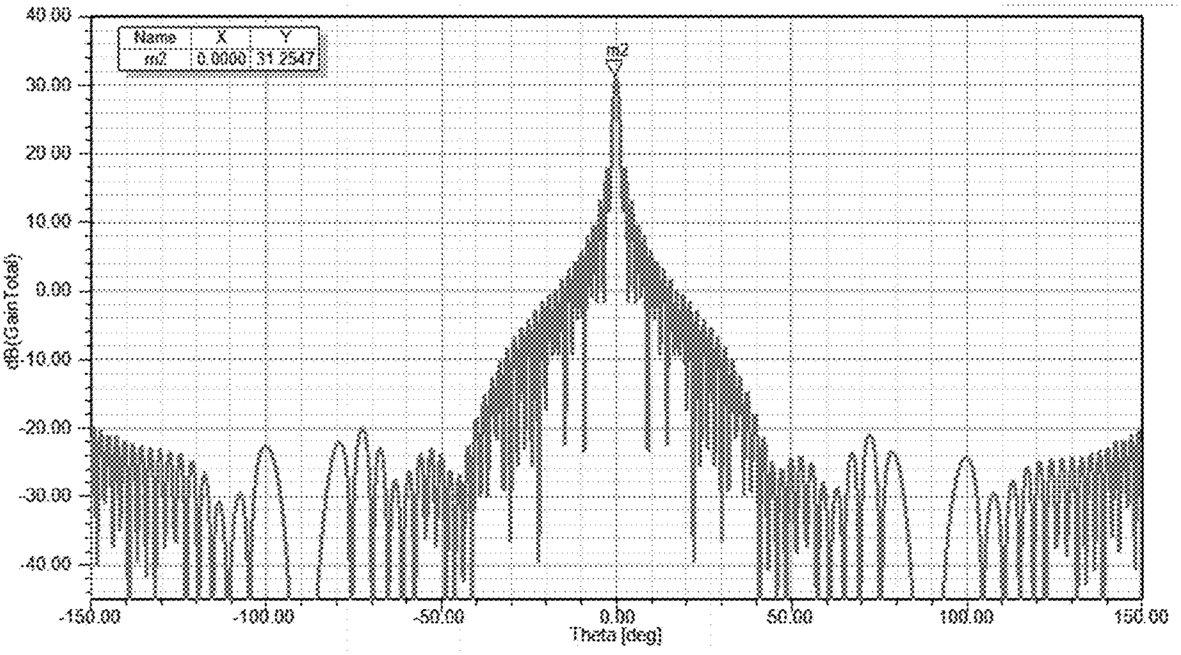
FIG. 17*a* to FIG. 17*c* are diagrams of several simulated gain results of the antenna array shown in FIG. 16 according to exemplary implementations of the present disclosure.
Figure 17B:
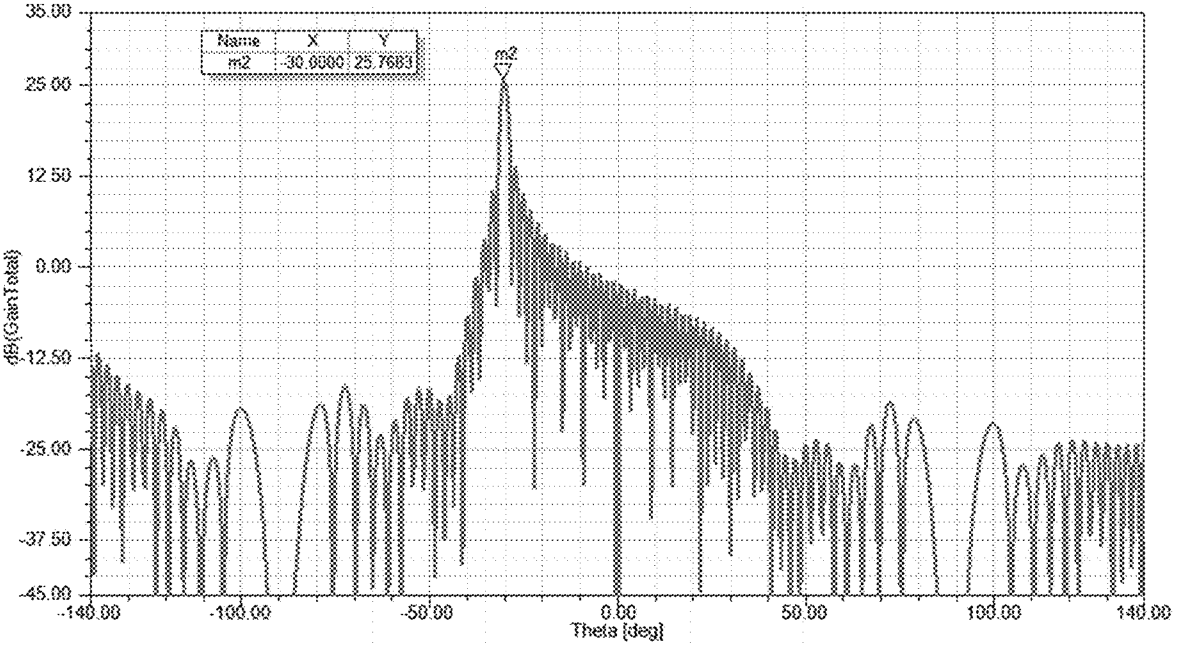
Figure 17C:
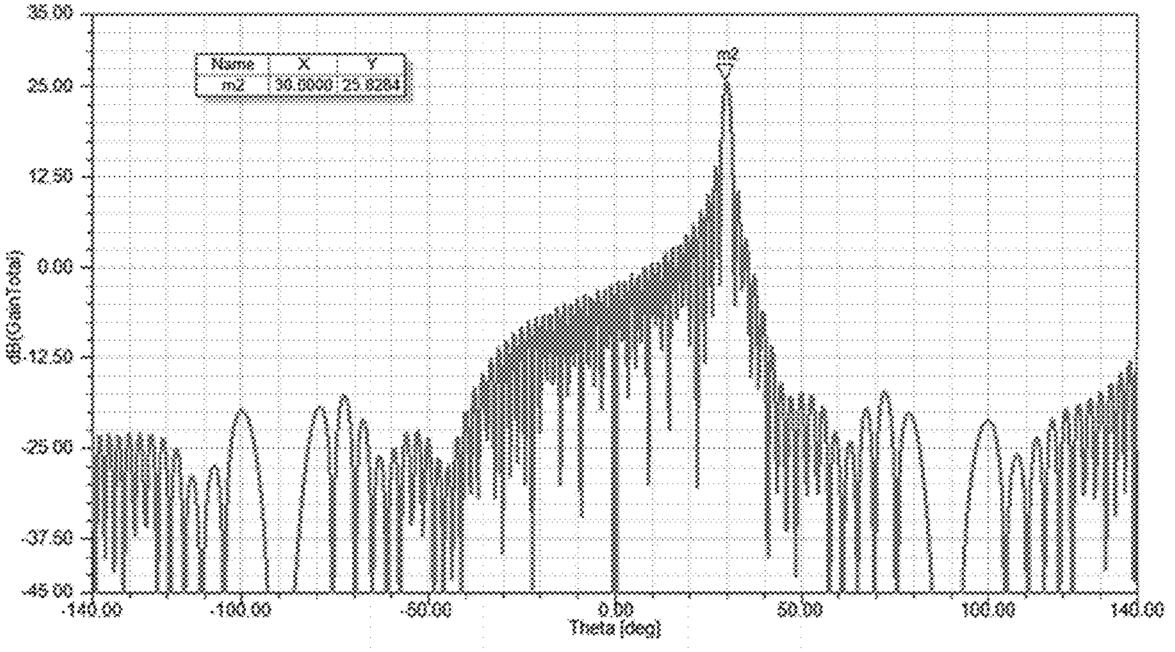

As shown in FIG. 17*a* to FIG. 17*c*, which are graphs of gain results simulated within positive or negative 30° at a frequency of 30 Ghz of the antenna array shown in FIG. 16 formed by arranging the plurality of antennas shown in FIG. 6*a* along the third direction Z. Positive or negative 30° refers to positive or negative 30 degrees with respect to a radiation direction of the antenna, that is, the value of the angle Theta in FIG. 6*a* ranges from positive 30° to negative 30°, and the value of Theta located at the centerline of the antenna along the first direction is 0°. FIG. 17*a* to FIG. 17*c* show the gain results simulated at 0°, −30° and 30°, respectively. The gain varies from 25.8 dB to 31.3 dB, which can meet the gain requirements of low-orbit Q-BAND satellites, wherein the Q-BAND can be called Q band, and typically the satellite communication band is at the frequency of 30 GHz to 50 GHz.

In the coordinate diagram shown in FIG. 17*a* to FIG. 17*c*, the ordinate is the gain and the abscissa is the angle.

The drawings of the embodiments of the present disclosure only involve structures involved in the embodiments of the present disclosure, and other structures may refer to usual designs.

The embodiments of the present disclosure, that is, features in the embodiments, may be combined with each other to obtain new embodiments if there is no conflict.

Although the implementation modes disclosed in the embodiments of the present disclosure are described above, the described contents are only implementation modes for facilitating understanding of the embodiments of the present disclosure, which are not intended to limit the embodiments of the present disclosure. Those skilled in the art to which the embodiments of the present disclosure pertain may make any modifications and variations in forms and details of implementation without departing from the spirit and scope of the embodiments of the present disclosure. Nevertheless, the scope of patent protection of the embodiments of the present disclosure shall still be subject to the scope defined by the appended claims.

The invention claimed is:

1. An antenna comprising a first conductive layer, a dielectric layer, and a second conductive layer which are stacked;

wherein the first conductive layer is provided as a microstrip line structure;

the second conductive layer is provided with a radiation structure and a director; the radiation structure comprises a first edge and a second edge opposite to each other along a first direction in a plane where the second conductive layer is located; the radiation structure is provided with a radiation slot away from the first edge, and the radiation slot comprises a first slot, a second slot and a third slot which are sequentially communicated along the first direction in the plane where the second conductive layer is located, a shape of the first slot is circular, a shape of the second slot is rectangular, the third slot gradually increases in dimension in a second direction from an end connected with the second slot to an end away from the second slot, and the third slot extends in the first direction from the second slot to the second edge of the radiation structure;

the director is disposed on the second conductive layer and located at a side of the third slot away from the second slot, and an orthographic projection of the director on the dielectric layer is at least partially overlapped with an orthographic projection of the third slot on the dielectric layer;

the second conductive layer is further provided with a plurality of metamaterial structures arranged in an array; and in the plane where the second conductive layer is located, in the first direction, the plurality of metamaterial structures are disposed at a side of the director away from the third slot, and an orthographic projection of the plurality of metamaterial structures on the dielectric layer is not overlapped with an orthographic projection of the radiation structure on the dielectric layer, and the plurality of metamaterial structures are disposed symmetrically with respect to a first centerline.

2. The antenna according to claim 1, wherein in the plane where the second conductive layer is located, the radiation slot is disposed symmetrically with respect to the first centerline and the director is disposed symmetrically with respect to the first centerline, and the first centerline is a centerline of the antenna along the first direction.

3. The antenna according to claim 1, wherein the microstrip line structure comprises a first conductive structure, a second conductive structure and a third conductive structure sequentially connected along the second direction in a plane where the first conductive layer is located, a shape of the first conductive structure is rectangular, the third conductive structure is fan-shaped, the second conductive structure gradually decreases in dimension in the first direction from an end connected with the first conductive structure to an end connected with the third conductive structure, the third conductive structure gradually increases in dimension in the first direction from an end connected with the second conductive structure to an end away from the second conductive structure; and in the plane where the first conductive layer is located, the microstrip line structure is symmetrically disposed along the first direction with respect to a second centerline, the second centerline is a centerline of the microstrip line structure along the second direction, an orthographic projection of the second centerline on the dielectric layer is perpendicular to an orthographic projection of the first centerline on the dielectric layer, and an orthographic projection of the second conductive structure on the dielectric layer is at least partially overlapped with an orthographic projection of the second slot on the dielectric layer.

4. The antenna according to claim 3, wherein in the plane where the first conductive layer is located, the first conductive structure has a dimension of 0.65 mm to 0.85 mm along the first direction and a dimension of 5 mm to 7 mm along the second direction;

the second conductive structure has a dimension of 1.6 mm to 2.2 mm along the second direction, and the end of the second conductive structure connected with the first conductive structure has a dimension of 0.45 mm to 0.6 mm along the first direction; the third conductive structure has a sector radius of 0.4 mm to 0.7 mm.

5. The antenna according to claim 1, wherein in the plane where the second conductive layer is located, the first slot has a radius of 0.8 mm to 1.2 mm, the second slot has a dimension of 2.5 mm to 3.5 mm in the first direction, and the second slot has a dimension of 0.4 mm to 0.8mm in the second direction.

6. The antenna according to claim 1, wherein dimensions of anyone of the metamaterial structures in the first direction and the second direction are each less than a length of half of a dielectric wavelength;

in the first direction, a distance between two adjacent metamaterial structures is less than the length of half of the dielectric wavelength; and in the second direction, a distance between two adjacent metamaterial structures is less than the length of half of the dielectric wavelength;

wherein the dielectric wavelength is a wavelength of a wave transmitted or received by the antenna in the dielectric layer.

7. The antenna according to claim 6, wherein in the plane where the second conductive layer is located, any one of the metamaterial structures has a dimension of 1.1 mm to 1.7 mm in the first direction, any one of the metamaterial structures has a dimension of 1 mm to 1.6 mm in the second direction, the distance between two adjacent metamaterial structures in the first direction is 0.3 mm to 0.7 mm, and the distance between two adjacent metamaterial structures in the second direction is 0.3 mm to 0.7 mm;

the antenna has a dimension of 14.8 mm to 15.6 mm in the second direction, the antenna has a dimension of 28 mm to 34 mm in the first direction, and a distance from the first edge of the radiation structure to a junction of the first slot and the second slot in the first direction is 5 mm to 7 mm; and the third slot has a maximum dimension of 8mm to 10 mm in the second direction.

8. The antenna according to claim 1, wherein a metamaterial structure comprises a first E-type structure, a second E-type structure and a first connection line connected with the first E-type structure and the second E-type structure, in the plane where the second conductive layer is located, the first E-shaped structure and the second E-shaped structure are symmetrically disposed with respect to a midperpendicular line of the first connection line, the first connection line extends along the second direction and is located at a position of a third centerline, the first E-shaped structure is disposed symmetrically with respect to the third centerline along the first direction, and the second E-shaped structure is disposed symmetrically with respect to the third centerline along the first direction, an opening of the first E-shaped structure faces a side away from the second E-shaped structure, and an opening of the second E-shaped structure faces a side away from the first E-shaped structure.

9. The antenna according to claim 8, wherein the first connection line has a dimension of 0.2 mm to 0.6 mm along the second direction; for ends located at a same side of the third centerline in the first direction, a distance between an end of the first E-shaped structure away from the second E-shaped structure and an end of the second E-shaped structure away from the first E-shaped structure in the second direction is 1 mm to 1.6 mm; at the position of the third centerline, a distance between an end of the first E-type structure away from the second E-type structure and an end of the second E-type structure away from the first E-type structure in the second direction is 1.1 mm to 1.7 mm; a width dimension of lines constituting the first E-shaped structure and the second E-shaped structure and a width dimension of a line constituting the first connection line are both 0.1 mm to 0.3 mm.

10. The antenna according to claim 1, wherein a metamaterial structure comprises a first I-shaped structure and a second I-shaped structure; in the plane where the second conductive layer is located, the first I-shaped structure comprises a first connection line and a second connection line extending along the first direction and a third connection line extending along the second direction, the third connection line is positioned at a midperpendicular line of the first connection line and the second connection line;

in the plane where the second conductive layer is located, the second I-shaped structure comprises a fourth connection line and a fifth connection line extending along the second direction and a sixth connection line extending along the first direction, the sixth connection line is located at a midperpendicular line of the fourth connection line and the fifth connection line; and the third connection line is located at a centerline of the sixth connection line, and the sixth connection line is located at a centerline of the third connection line.

11. The antenna according to claim 10, wherein line widths of the first connection line to the sixth connection line are each 0.1 mm to 0.3 mm; in the plane where the second conductive layer is located, the first connection line and second connection line have a dimension from 0.8 mm to 1.3 mm along the first direction, the third connection line has a dimension from 0.7 mm to 1.5 mm along the second direction, the fourth connection line and the fifth connection line have a dimension from 0.8 mm to 1.3 mm along the second direction, and the sixth connection line has a dimension from 0.7 mm to 1.5 mm along the first direction.

12. The antenna according to claim 1, wherein the radiation structure further comprises a third edge and a fourth edge opposite to each other along the second direction in the plane where the second conductive layer is located; on the plane where the second conductive layer is located, the radiation structure is provided with a plurality of flow suppression grooves, and the flow suppression grooves comprise a plurality of first flow suppression grooves arranged along the first direction and a plurality of second flow suppression grooves arranged along the first direction, the plurality of first flow suppression grooves and the plurality of second flow suppression grooves are symmetrically disposed with respect to a centerline of the antenna along the first direction; the plurality of first flow suppression grooves are disposed at a side of the third slot, and the plurality of second flow suppression grooves are disposed at a side of the third slot away from the plurality of first flow suppression grooves; the first flow suppression grooves extend to the third edge, and the second flow suppression grooves extend to the fourth edge.

13. The antenna according to claim 12, wherein extension directions of the first flow suppression grooves and the second flow suppression grooves are perpendicular to the centerline of the antenna along the first direction.

14. The antenna according to claim 12, wherein a shape of a flow suppression groove is rectangular; on the plane where the second conductive layer is located, a dimension of the flow suppression groove along the second direction satisfies a following formula: $0.25*\lambda/g/sqrt(\varepsilon 0)$, where $\lambda g$ is a wavelength of the antenna's low-frequency dielectric frequency, $\varepsilon 0$ is a dielectric constant of a dielectric plate, and sqrt $(\varepsilon 0)$ is an arithmetic square root of the dielectric constant $\varepsilon 0$ of the dielectric plate.

15. The antenna according to claim 14, wherein on the plane where the second conductive layer is located, a flow suppression groove has a dimension of 4.5 mm to 5.5 mm along the second direction, and the flow suppression groove has a dimension of 0.5 mm to 1.5mm along first direction.

16. The antenna according to claim 12, wherein in the plane where the second conductive layer is located, any one of the flow suppression grooves comprises a first groove edge, a second groove edge and a third groove edge, a shape of the first groove edge and the second groove edge is a linear shape extending along the second direction, a shape of the third groove edge is an arc shape protruding toward the radiation groove, and two ends of the third groove edge are respectively connected with one end of the first groove edge and one end of the second groove edge close to the radiation groove.

17. The antenna according to claim 1, wherein a shape of the director is rectangular, and the rectangular director is symmetrically disposed with respect to the first centerline; or the shape of the director is elliptical, and the elliptical director is symmetrically disposed with respect to the first centerline; or the shape of the director is circular, and the circular director is symmetrically disposed with respect to the first centerline; or the shape of the director is isosceles triangular, and the isosceles triangular director is symmetrically disposed with respect to the first centerline, an apex angle of the isosceles triangle is located between the radiation slot and a bottom edge of the isosceles triangle, a length of the bottom edge of the isosceles triangle is 1.8 mm to 2.2 mm, and a length of two waists of the isosceles triangle is 2 mm to 4 mm.

18. An electronic device, comprising at least one antenna according to claim 1.

19. The electronic device according to claim 18, comprising a plurality of the antennas, the plurality of the antennas are arranged along a third direction to form an antenna array, and orthographic projections of the plurality of antennas on a plane where the first direction and the second direction are located are overlapped, and orthographic projections of radiation slots in the plurality of the antennas on a plane where the first direction and the second direction are located are overlapped.

* * * * *